US012661889B2

(12) United States Patent
Yokoyama et al.

(10) Patent No.: US 12,661,889 B2
(45) Date of Patent: Jun. 23, 2026

(54) LIQUID EJECTING HEAD AND LIQUID EJECTING APPARATUS

(71) Applicant: SEIKO EPSON CORPORATION, Tokyo (JP)

(72) Inventors: Naoto Yokoyama, Matsumoto (JP); Masaki Mori, Shiojiri (JP); Hitoshi Takaai, Azumino (JP); Motoki Takabe, Shiojiri (JP); Toshihiro Shimizu, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 155 days.

(21) Appl. No.: 18/795,259

(22) Filed: Aug. 6, 2024

(65) Prior Publication Data

US 2025/0050637 A1 Feb. 13, 2025

(30) Foreign Application Priority Data

Aug. 9, 2023 (JP) ................................ 2023-130038

(51) Int. Cl.
*B41J 2/14* (2006.01)

(52) U.S. Cl.
CPC .. *B41J 2/14233* (2013.01); *B41J 2002/14491* (2013.01)

(58) Field of Classification Search
CPC ................ B41J 2/14201; B41J 2/14233; B41J 2/14274; B41J 2/14282; B41J 2/14298; B41J 2002/14225; B41J 2002/1425; B41J 2002/14266; B41J 2002/14306; B41J 2/04588; B41J 2/04581; B41J 2/01; B41J 2002/14419; B41J 2002/14491
See application file for complete search history.

(56) References Cited

U.S. PATENT DOCUMENTS

| | | | | |
|---|---|---|---|---|
| 8,459,767 | B2 * | 6/2013 | Sumi .................. | H10N 30/2047 347/11 |
| 2010/0110148 | A1 | 5/2010 | Kuriki et al. | |
| 2017/0087843 | A1 * | 3/2017 | Mikoshiba ............. | B41J 2/1628 |

FOREIGN PATENT DOCUMENTS

| | | | | |
|---|---|---|---|---|
| JP | 2006231928 | * | 9/2006 | .............. B41J 2/045 |
| JP | 2010-135748 | A | 6/2010 | |

* cited by examiner

*Primary Examiner* — Kristal Feggins
(74) *Attorney, Agent, or Firm* — WORKMAN NYDEGGER

(57) ABSTRACT

A liquid ejecting head may include a first electrode to which a reference voltage is applied, a second electrode to which a drive voltage is applied, a piezoelectric body provided between the first electrode and the second electrode and driven by a voltage difference between the reference voltage and the drive voltage, a diaphragm that vibrates in response to the driving of the piezoelectric body, and a nozzle from which a liquid is ejected by the vibration of the diaphragm.

10 Claims, 17 Drawing Sheets

LIQUID EJECTING HEAD AND LIQUID EJECTING APPARATUS

The present application is based on, and claims priority from JP Application Serial Number 2023-130038, filed Aug. 9, 2023, the disclosure of which is hereby incorporated by reference herein in its entirety.

BACKGROUND

1. Technical Field

The present disclosure relates to a liquid ejecting head and a liquid ejecting apparatus.

2. Related Art

A liquid ejecting apparatus that includes a liquid ejecting head that ejects a liquid such as ink onto a medium such as printing paper has been proposed. A piezoelectric type ink jet printer is known as the liquid ejecting apparatus. The piezoelectric type uses a piezoelectric element that vibrates a diaphragm that forms a part of a wall surface of a pressure chamber. As the piezoelectric element vibrates the diaphragm, a liquid filled in the pressure chamber is ejected from a nozzle.

A piezoelectric element included in a liquid ejecting head described in JP-A-2010-135748 includes two electrodes and a piezoelectric body interposed between the two electrodes. In such a piezoelectric body, a saturation polarization, a remanent polarization, and a coercive electric field in polarization-electric field hysteresis characteristics satisfy predetermined conditions.

In general, in a piezoelectric element included in a liquid ejecting head, a reference voltage that is constant regardless of time is applied to one of two electrodes, and a drive voltage that changes with time is applied to the other electrode. Then, a displacement amount of a diaphragm vibrated by the piezoelectric element may be increased by setting a voltage difference between the minimum value of the drive voltage and the reference voltage (the minimum value of an applied voltage applied to a piezoelectric body), and a voltage difference between the maximum value of the drive voltage and the reference voltage (the maximum value of the applied voltage applied to the piezoelectric body) to be large. Therefore, an ejection amount can be easily increased to a desired ejection amount.

Hitherto, the voltage difference between the minimum value of the drive voltage and the reference voltage has been set as a voltage at a coercive electric field in order to increase a difference between the voltage difference between the minimum value of the drive voltage and the reference voltage and the voltage difference between the maximum value of the drive voltage and the reference voltage. However, it has been found that simply increasing the difference causes other problems.

For example, when the voltage difference between the minimum value of the drive voltage and the reference voltage is set as the voltage at the coercive electric field, it is necessary to apply a specific voltage as the reference voltage. Therefore, a circuit and a wiring for applying the voltage are required, which causes an increase in cost and size. For this reason, it is difficult to provide a piezoelectric element with a simple configuration and excellent ejection performance.

For example, when the voltage is applied to the piezoelectric body for a long time, an imprint phenomenon in which a hysteresis shape of the piezoelectric body is shifted occurs. As a result, the coercive electric field may be shifted. Therefore, even when the reference voltage and the drive voltage are set based on the initial hysteresis shape of the piezoelectric body, it is difficult to reduce a rate of decrease in the ejection amount with the number of times of driving. Therefore, it is difficult to obtain stable ejection performance over a long period of time.

As described above, simply increasing the difference between the voltage difference between the minimum value of the drive voltage and the reference voltage and the voltage difference between the maximum value of the drive voltage and the reference voltage may cause other problems.

SUMMARY

According to an aspect of the present disclosure, a liquid ejecting head includes: a first electrode to which a reference voltage that does not change over time is applied; a second electrode to which a drive voltage that changes over time is applied; a piezoelectric body provided between the first electrode and the second electrode and driven by a voltage difference between the reference voltage and the drive voltage; a diaphragm that vibrates in response to the driving of the piezoelectric body; and a nozzle from which a liquid is ejected by the vibration of the diaphragm, in which in a case where a displacement amount of the diaphragm when a first reference voltage is applied to the first electrode and a first drive voltage is applied to the second electrode is a first displacement amount, and a displacement amount of the diaphragm when a second reference voltage is applied to the first electrode and a second drive voltage is applied to the second electrode is a second displacement amount, a difference between a maximum value and a minimum value of the first drive voltage is equal to a difference between a maximum value and a minimum value of the second drive voltage, a difference between the minimum value of the first drive voltage and the first reference voltage corresponds to a coercive electric field of the piezoelectric body, a difference between the minimum value of the second drive voltage and the second reference voltage is closer to 0 than the difference between the minimum value of the first drive voltage and the first reference voltage, and the second displacement amount is larger than 90% of the first displacement amount.

DESCRIPTION OF EMBODIMENTS

Figure 1:
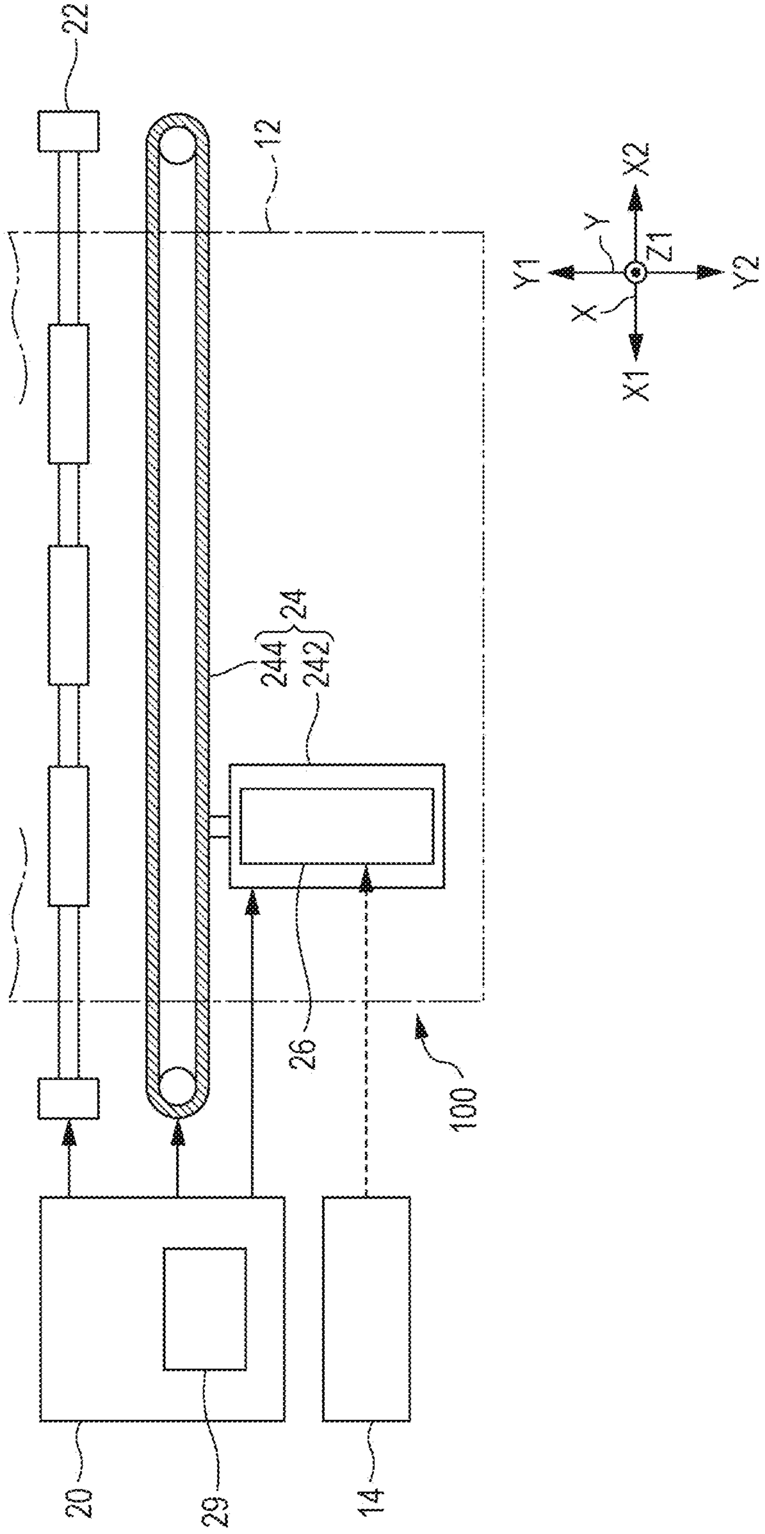
FIG. 1 is a schematic view illustrating a configuration of a liquid ejecting apparatus according to a first embodiment.

Hereinafter, exemplary embodiments according to the present disclosure will be described with reference to the accompanying drawings. Note that the dimensions or the scale of each component may differ appropriately from actual dimensions or scales, and some portions are schematically illustrated in the drawings to facilitate understanding. Further, the scope of the present disclosure is not limited to the embodiments unless otherwise specified in the following description. Note that "being the same" includes not only a case of being exactly the same, but also a case of being subject to a degree of measurement error.

In the following description, an X axis, a Y axis, and a Z axis that intersect one another are appropriately used. A direction along the X axis is referred to as an X1 direction, and a direction opposite to the X1 direction is referred to as an X2 direction. Directions opposite to each other along the Y axis are referred to as a Y1 direction and a Y2 direction. Directions opposite to each other along the Z axis are referred to as a Z1 direction and a Z2 direction. Viewing in the direction along the Z axis is referred to as "plan view". The Z axis is typically a vertical axis. However, the Z axis does not have to be a vertical axis. The X axis, the Y axis, and the Z axis are typically orthogonal to one another. However, the X axis, the Y axis, and the Z axis are not limited thereto, and it is sufficient if the X axis, the Y axis, and the Z axis intersect one another within an angle range of 80° to 100°.

1. First Embodiment

1-1. Overall Configuration of Liquid Ejecting Apparatus 100

FIG. 1 is a schematic view illustrating a configuration of a liquid ejecting apparatus 100 according to a first embodiment. The liquid ejecting apparatus 100 is an ink jet printing apparatus that ejects ink, which is an example of a "liquid", in the form of droplets toward a medium 12. The medium 12 is, for example, printing paper. The medium 12 is not limited to printing paper, and may be a printing target made of any material such as a resin film or cloth, for example.

As illustrated in FIG. 1, a liquid container 14 that stores the ink is mounted on the liquid ejecting apparatus 100. Specific aspects of the liquid container 14 include, for example, a cartridge that is attachable to and detachable from the liquid ejecting apparatus 100, a bag-shaped ink pack made of a flexible film, and an ink tank that can be refilled with ink. The type of the ink stored in the liquid container 14 is arbitrary.

The liquid ejecting apparatus 100 includes a control unit 20, a transport mechanism 22, a movement mechanism 24, and a liquid ejecting head 26. The control unit 20 includes, for example, a processing circuit such as a central processing unit (CPU) or a field programmable gate array (FPGA), and a storage circuit such as a semiconductor memory, and controls an operation of each element of the liquid ejecting apparatus 100. The control unit 20 includes a voltage application unit 29 that controls driving of a piezoelectric element 44 described below to cause a nozzle to eject the ink.

The transport mechanism 22 transports the medium 12 in the Y2 direction under the control of the control unit 20. The movement mechanism 24 reciprocates the liquid ejecting head 26 in the X1 direction and the X2 direction under the control of the control unit 20. In the example illustrated in FIG. 1, the movement mechanism 24 includes a substantially box-shaped transport body 242 called a carriage that accommodates the liquid ejecting head 26, and a transport belt 244 to which the transport body 242 is fixed. The number of liquid ejecting heads 26 mounted on the transport body 242 is not limited to one, and may be plural. In addition to the liquid ejecting head 26, the above-described liquid container 14 may be mounted on the transport body 242.

The liquid ejecting head 26 ejects the ink supplied from the liquid container 14 onto the medium 12 from each of a plurality of nozzles in the Z2 direction under the control of the control unit 20. The ejection is performed in parallel with the transport of the medium 12 by the transport mechanism 22 and the reciprocating movement of the liquid ejecting head 26 by the movement mechanism 24, thereby forming an image on the surface of the medium 12 with the ink.

Such a liquid ejecting apparatus 100 includes the liquid ejecting head 26 described below and the control unit 20. The control unit 20 includes the voltage application unit 29 that causes nozzles N to eject the ink. Since the liquid ejecting apparatus 100 includes the liquid ejecting head 26 having the characteristics described below, it is possible to improve ejection performance while ensuring a desired ejection amount.

1-2. Overall Configuration of Liquid Ejecting Head

Figure 2:
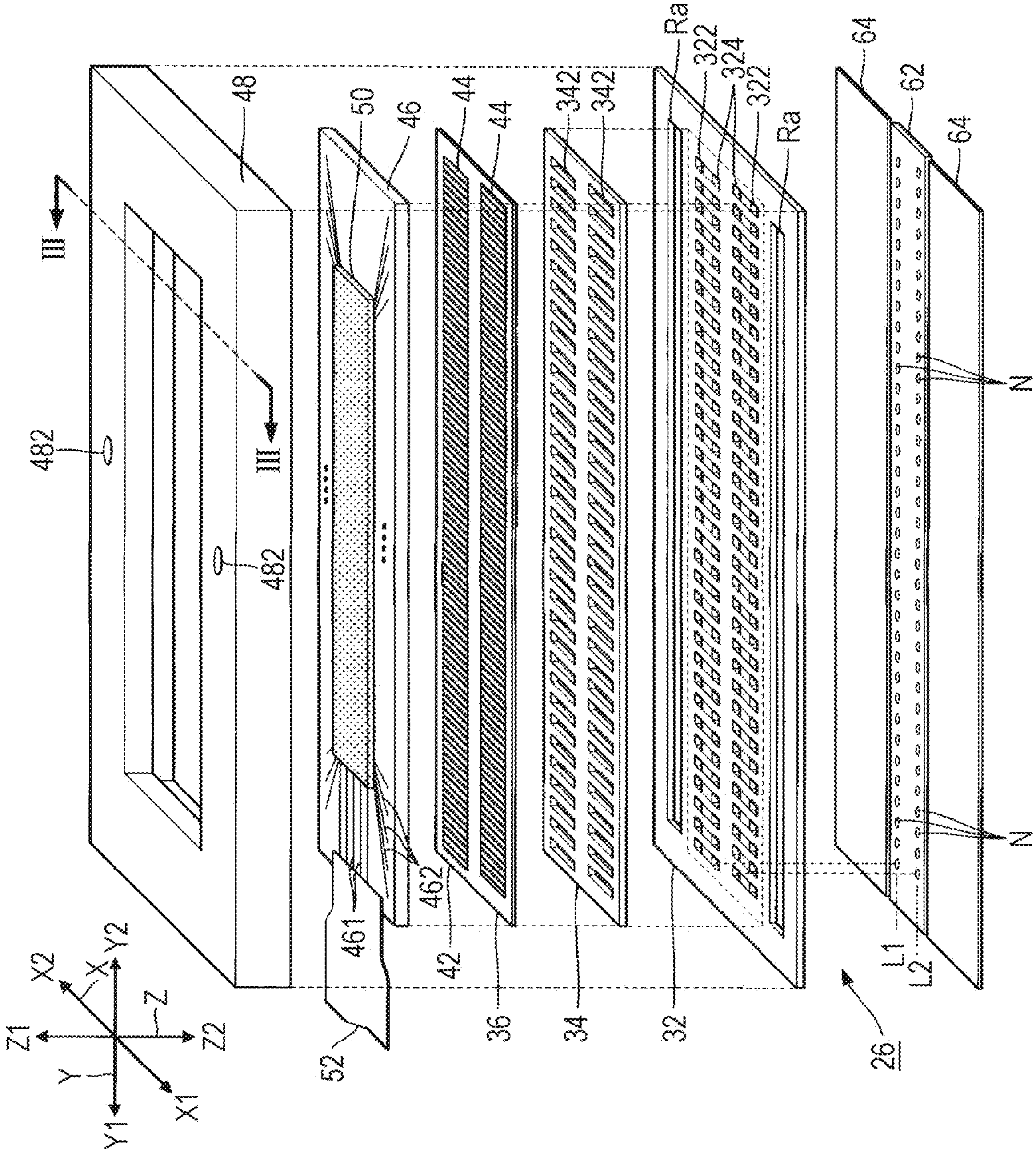
FIG. 2 is an exploded perspective view of a liquid ejecting head illustrated in FIG. 1.
Figure 3:
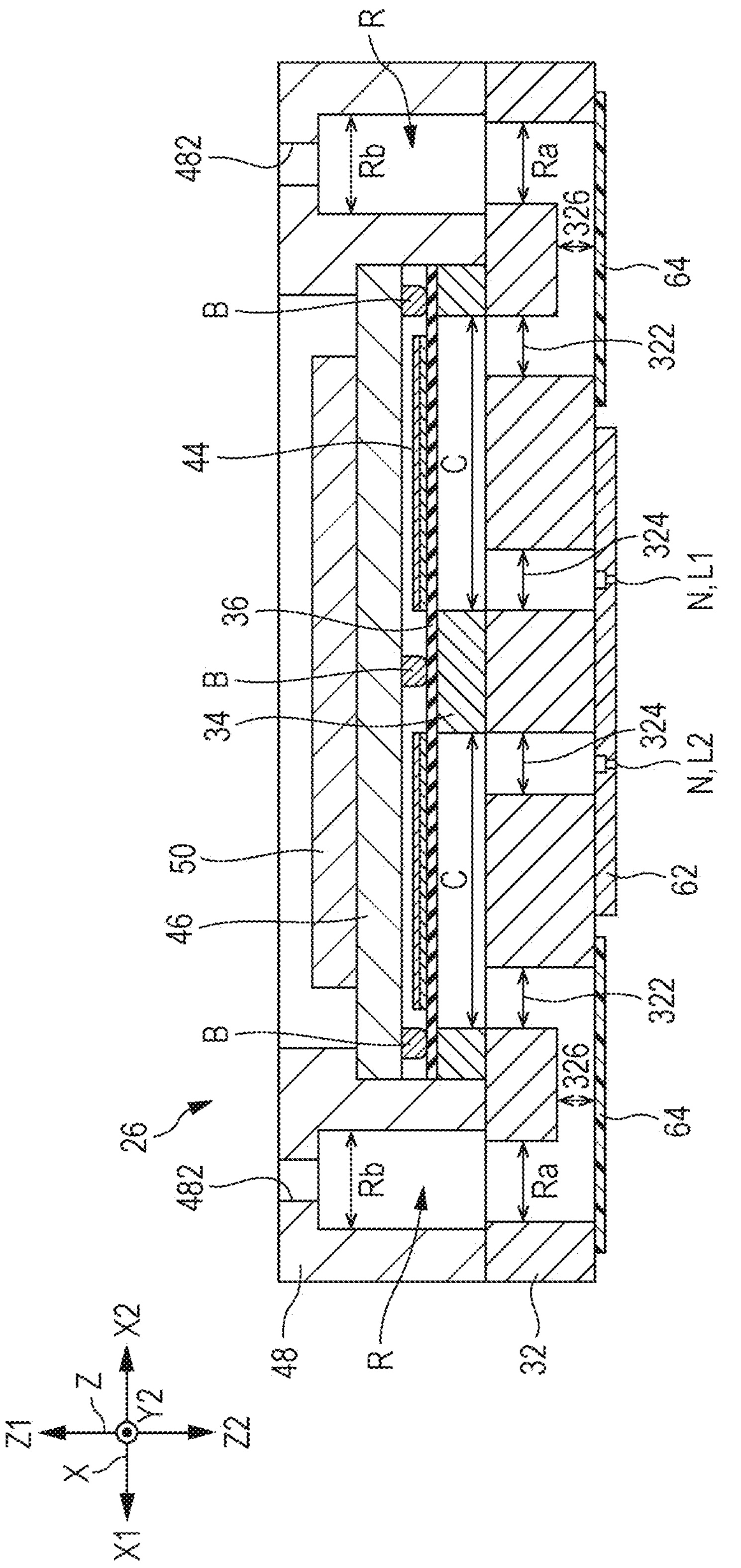
FIG. 3 is a cross-sectional view of a part of the liquid ejecting head illustrated in FIG. 2.

FIG. 2 is an exploded perspective view of the liquid ejecting head 26 illustrated in FIG. 1. FIG. 3 is a cross-sectional view of a part of the liquid ejecting head illustrated in FIG. 2, and is a cross-sectional view taken along line III-III of FIG. 2. As illustrated in FIG. 2, the liquid ejecting head 26 includes the plurality of nozzles N arranged in a direction along the Y axis. In the example illustrated in FIG. 2, the plurality of nozzles N are divided into a first row L1 and a second row L2 that are spaced apart from each other in a direction along the X axis. Each of the first row L1 and the second row L2 is a set of the plurality of nozzles N linearly arranged in the direction along the Y axis. Here, an element related to each nozzle N of the first row L1 and an element related to each nozzle N of the second row L2 in the liquid ejecting head 26 are approximately symmetrical to each other in the direction along the X axis. In the following description, elements corresponding to the first row L1 will be mainly described, and a description of elements corresponding to the second row L2 will be omitted as appropriate.

The positions of the plurality of nozzles N in the first row L1 and the plurality of nozzles N in the second row L2 in the direction along the Y axis may be the same as or different from each other. Further, the element related to each nozzle N of one of the first row L1 and the second row L2 may be omitted.

As illustrated in FIGS. 2 and 3, the liquid ejecting head 26 includes a nozzle plate 62, a vibration absorber 64, a flow path substrate 32, a pressure chamber substrate 34, a diaphragm 36, a wiring substrate 46, a housing portion 48, and a drive circuit 50. Each of the nozzle plate 62, the vibration absorber 64, the flow path substrate 32, the pressure chamber substrate 34, the diaphragm 36, the wiring substrate 46, and the housing portion 48 is an elongated plate-shaped member along the Y axis. The nozzle plate 62, the flow path substrate 32, the pressure chamber substrate 34, the diaphragm 36, and the wiring substrate 46 are arranged in this order in the Z1 direction.

The nozzle plate 62 is a plate-shaped member in which the plurality of nozzles N are formed. Each of the plurality of nozzles N is a circular through-hole through which the ink passes. The nozzles N eject the ink by vibration of the diaphragm 36. The nozzle plate 62 is bonded to the flow path substrate 32 using, for example, an adhesive.

A flow path for supplying the ink to the plurality of nozzles N is formed in the flow path substrate 32. Specifically, a space Ra, a plurality of supply flow paths 322, a plurality of communicating flow paths 324, and a supply liquid chamber 326 are formed in the flow path substrate 32. The space Ra is an elongated opening extending in the direction along the Y axis in plan view when viewed from the direction along the Z axis. Each of the supply flow paths 322 and the communicating flow paths 324 is a through-hole formed for each nozzle N. The supply liquid chamber 326 is an elongated space that extends over the plurality of nozzles N in the direction along the Y axis, and makes the space Ra and the plurality of supply flow paths 322 be in communication with each other. Each of the plurality of communicating flow paths 324 overlaps one nozzle N corresponding to the corresponding communicating flow path 324 in plan view. The pressure chamber substrate 34 is bonded to the flow path substrate 32 using, for example, an adhesive.

A plurality of pressure chambers C are formed in the pressure chamber substrate 34. The plurality of pressure chambers C are arranged in the direction along the Y axis. Each pressure chamber C is formed for each nozzle N and is an elongated space extending in the direction along the X axis in plan view. The pressure chamber C is a space positioned between the flow path substrate 32 and the diaphragm 36. The pressure chamber C communicates with the nozzle N through the communicating flow path 324 and communicates with the space Ra through the supply flow path 322 and the supply liquid chamber 326.

Each of the nozzle plate 62, the flow path substrate 32, and the pressure chamber substrate 34 is produced by processing a single crystal silicon substrate by using dry etching, wet etching, or the like. However, another known method and may be used to produce each of the nozzle plate 62, the flow path substrate 32, and the pressure chamber substrate 34 as appropriate.

The diaphragm 36 is disposed on a surface of the pressure chamber substrate 34 that faces the Z2 direction. The diaphragm 36 is a plate-like member that can elastically vibrate.

A plurality of piezoelectric elements 44 corresponding to the nozzles N are arranged on a surface of the diaphragm 36 that faces the Z1 direction. Each piezoelectric element 44 has an elongated shape extending in the direction along the X axis in plan view. The plurality of piezoelectric elements 44 are arranged in the direction along the Y axis in such a way as to correspond to the plurality of pressure chambers C. The piezoelectric element 44 is deformed when a voltage is applied. When the diaphragm 36 vibrates due to the deformation, a pressure in the pressure chamber C fluctuates, as a result of which the ink is ejected from the nozzle N.

The housing portion 48 is a case for storing the ink to be supplied to the plurality of pressure chambers C. As illustrated in FIG. 3, a space Rb is formed in the housing portion 48. The space Rb of the housing portion 48 and the space Ra of the flow path substrate 32 are in communication with each other. A space formed with the space Ra and the space Rb functions as a liquid storing chamber R, which is a reservoir in which the ink to be supplied to the plurality of pressure chambers C is stored. The ink is supplied to the liquid storing chamber R through an inlet 482 formed in the housing portion 48. The ink in the liquid storing chamber R is supplied to the pressure chamber C through the supply liquid chamber 326 and each supply flow path 322.

The vibration absorber 64 is a flexible film that forms a wall surface of the liquid storing chamber R. The vibration absorber 64 is a compliance substrate that absorbs pressure fluctuations of the ink within the liquid storing chamber R.

The wiring substrate 46 is a plate-shaped member in which wirings for electrically coupling the drive circuit 50 and the plurality of piezoelectric elements 44 to each other are formed. A surface of the wiring substrate 46 that faces the Z2 direction is bonded to the diaphragm 36 via a plurality of bumps B. The drive circuit 50 is mounted on a surface of the wiring substrate 46 that faces the Z1 direction. The drive circuit 50 is an integrated circuit (IC) chip that outputs a drive voltage Com for driving each piezoelectric element 44 and a reference voltage E0. The wiring substrate 46 is not limited to a rigid substrate, and may be, for example, a flexible printed circuit (FPC) or a flexible flat cable (FFC). In this case, the drive circuit 50 may be mounted on the wiring substrate 46, or the wiring substrate 46 may also serve as an external wiring 52.

An end portion of the external wiring 52 is bonded to the surface of the wiring substrate 46 that faces the Z1 direction. The external wiring 52 includes, for example, a connection component such as a flexible printed circuit (FPC) or a flexible flat cable (FFC). As illustrated in FIG. 2, a plurality of wirings 461 that electrically couple the external wiring 52 and the drive circuit 50 to each other, and a plurality of wirings 462 through which the drive voltage Com and the reference voltage E0 output from the drive circuit 50 are supplied are formed on the wiring substrate 46.

1-3. Diaphragm 36 and Piezoelectric Element 44

Figure 4:
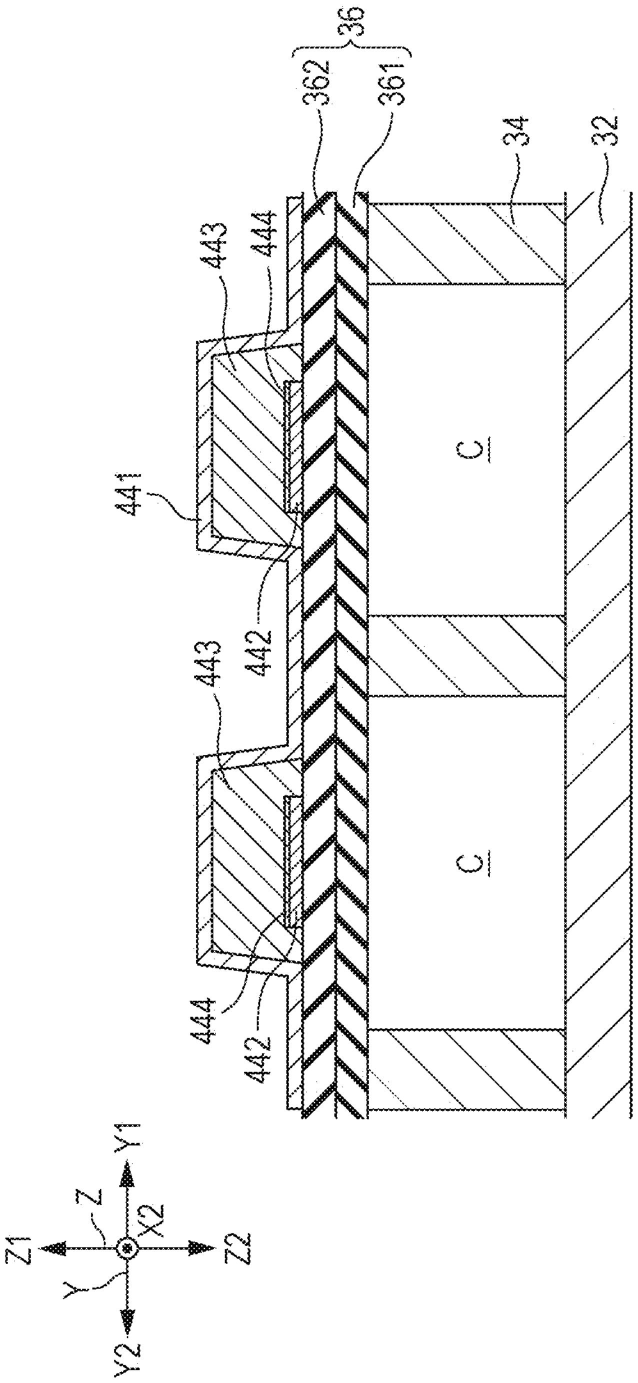
FIG. 4 is an enlarged cross-sectional view of a part of the liquid ejecting head illustrated in FIG. 3.

FIG. 4 is an enlarged cross-sectional view of a part of the liquid ejecting head 26 illustrated in FIG. 3. The diaphragm 36 illustrated in FIG. 4 vibrates in response to driving of a piezoelectric body 443 included in the piezoelectric element 44 described below. The diaphragm 36 has a first layer 361 and a second layer 362. The first layer 361 and the second layer 362 are stacked in this order in the Z1 direction.

The first layer 361 is, for example, an elastic film made of silicon dioxide ($SiO_2$). The elastic film is formed by, for example, performing thermal oxidation on one surface of a single crystal silicon substrate. The second layer 362 is, for example, an insulating film made of zirconium dioxide ($ZrO_2$). The insulating film is formed by, for example, forming a zirconium layer by using a sputtering method, and performing thermal oxidation on the layer. Zirconium dioxide has an excellent electrical insulation property, mechanical strength, and toughness. Therefore, as the diaphragm 36 has the second layer 362 containing zirconium dioxide, the characteristics of the diaphragm 36 can be improved.

Another layer made of metal oxide or the like may be interposed between the first layer 361 and the second layer 362. Furthermore, a part of or the entire diaphragm 36 may be formed integrally with the pressure chamber substrate 34. Further, the diaphragm 36 may have layers of a single material.

The pressure chamber C of the pressure chamber substrate 34 is formed, for example, by performing anisotropic etching on a single crystal silicon substrate. For example, a potassium hydroxide aqueous solution (KOH) is used as an etching solution for the anisotropic etching. Further, the first layer 361 is used as an etching stop layer for the anisotropic etching. Although not illustrated, the shape of the pressure chamber C in plan view is rectangular. However, the shape of the pressure chamber C in plan view is not limited thereto and is arbitrary. For example, when the pressure chamber C is formed by performing anisotropic etching on a single crystal silicon substrate with a (110) plane orientation, the shape of the pressure chamber C in plan view is a parallelogram.

The piezoelectric element 44 overlaps the pressure chamber C in plan view. The piezoelectric element 44 includes a second electrode 442, a seed layer 444, the piezoelectric body 443, and a first electrode 441 stacked in this order in the Z1 direction. Another layer such as a layer for increasing adhesion may be appropriately interposed between layers of the piezoelectric element 44 or between the piezoelectric element 44 and the diaphragm 36.

The second electrodes 442 of the piezoelectric elements 44 are individual electrodes spaced apart from each other. Specifically, a plurality of second electrodes 442 extending in the direction along the X axis are arranged at intervals in the direction along the Y axis. The drive voltage Com for ejecting the ink from the nozzle N is applied to the second electrode 442 of each piezoelectric element 44 via the drive circuit 50.

Examples of a material of the second electrode 442 include a metal material such as aluminum (Al), nickel (Ni), gold (Au), or copper (Cu), or an alloy thereof. The second electrode 442 may have a single layer or multiple layers. For example, the second electrode 442 includes a first layer made of titanium (Ti), a second layer made of platinum (Pt), and a third layer made of iridium (Ir), and the first to third layers are stacked in this order in the Z1 direction. Further, the second electrode 442 is formed, for example, by a known film forming technique such as a sputtering method, and a known processing technique using photolithography, etching, or the like.

The first electrode 441 is a band-shaped common electrode that extends in the direction along the Y axis in such a way that the first electrodes 441 of the plurality of piezoelectric elements 44 are continuously connected. The reference voltage E0 is applied to the first electrode 441.

Examples of a material of the first electrode 441 include a metal material such as aluminum (Al), nickel (Ni), gold (Au), or copper (Cu), or an alloy thereof. The first electrode 441 may have a single layer or multiple layers. For example, the first electrode 441 includes a layer made of iridium, a layer made of iridium oxide (IrOx), a layer made of titanium oxide (TiOx), and a layer made of iridium, the layers being stacked in this order on the piezoelectric body 443. The first electrode 441 is formed, for example, by a known film forming technique such as a sputtering method, and a known processing technique using photolithography, etching, or the like.

The piezoelectric body 443 is disposed between the first electrode 441 and the second electrode 442. The piezoelectric body 443 has, for example, a band shape extending along the Y axis, and a plurality of notches are formed in such a way that the piezoelectric body 443 is separated for each piezoelectric element 44. The piezoelectric body 443 may be individually provided in each of the plurality of piezoelectric elements 44.

The piezoelectric body 443 is made of a piezoelectric material having a perovskite crystal structure represented by a general composition formula $ABO_3$. Examples of the piezoelectric material include lead titanate ($PbTiO_3$), lead zirconate titanate (PZT: $Pb(Zr,Ti)O_3$), lead zirconate ($PbZrO_3$), lead lanthanum titanate ($(Pb,La), TiO_3$), lead lanthanum zirconate titanate ($(Pb,La)(Zr,Ti)O_3$), lead zirconium titanate niobate ($Pb(Zr,Ti,Nb)O_3$), and lead zirconium titanate magnesium niobate ($Pb(Zr,Ti)(Mg,Nb)O_3$). Among these, lead zirconate titanate (PZT) may be used as a material of the piezoelectric body 443. The piezoelectric body 443 may contain a small amount of other elements such as impurities.

The piezoelectric body 443 is formed by, for example, forming a precursor layer of the piezoelectric body 443 by a sol-gel method or a metal organic decomposition (MOD) method, and then firing and crystallizing the precursor layer. The piezoelectric body 443 may have a single layer or multiple layers.

The seed layer 444 is disposed between the second electrode 442 and the piezoelectric body 443. The seed layer 444 is provided in the same region and in the same shape as the second electrode 442 in plan view. It is sufficient if the seed layer 444 is disposed between the second electrode 442 and the piezoelectric body 443. For example, the seed layer 444 may be provided in the same region and in the same shape as the piezoelectric body 443 in plan view.

The seed layer 444 has a function of improving an orientation of the piezoelectric body 443 when forming the piezoelectric body 443. Specifically, the seed layer 444 is made of titanium (Ti), for example. In a case where the seed layer 444 is made of titanium, the island-like Ti becomes a crystal nucleus and improves the orientation of the piezoelectric body 443 when forming the piezoelectric body 443. The seed layer 444 containing titanium is formed, for example, by a known film forming technique such as a sputtering method, and a known processing technique using photolithography, etching, or the like. The seed layer 444 may be considered to be a part of the second electrode 442.

Further, the seed layer 444 is not limited to a structure made of titanium, and may be made of a complex oxide having a perovskite structure containing lead, iron, and titanium as constituent elements, for example. In this case, when forming the piezoelectric body 443, the piezoelectric body 443 is influenced by the crystal structure of the seed layer 444, so that the orientation of the piezoelectric body 443 is improved. Examples of the complex oxide include a solid solution of $PbFeO_3$ and $PbTiO_3$, and is represented by $Pb(Fe,Ti)O_3$. The seed layer 444 that is made of such a complex oxide is formed by, for example, forming a precursor layer of the complex oxide by a sol-gel method or a MOD method, and then firing and crystallizing the precursor layer.

In the piezoelectric element 44 described above, the piezoelectric body 443 is deformed according to a voltage applied between the first electrode 441 and the second electrode 442. The drive voltage Com corresponding to the ejection amount of the ink is applied to the second electrode 442. The reference voltage E0 that is constant regardless of the ejection amount of the ink is applied to the first electrode 441. When a voltage difference occurs between the first electrode 441 and the second electrode 442 due to the application of the drive voltage Com and the reference voltage E0, the piezoelectric body 443 is deformed.

1-4. Drive Voltage Com, Reference Voltage E0, and Applied Voltage Ea

Figure 5:
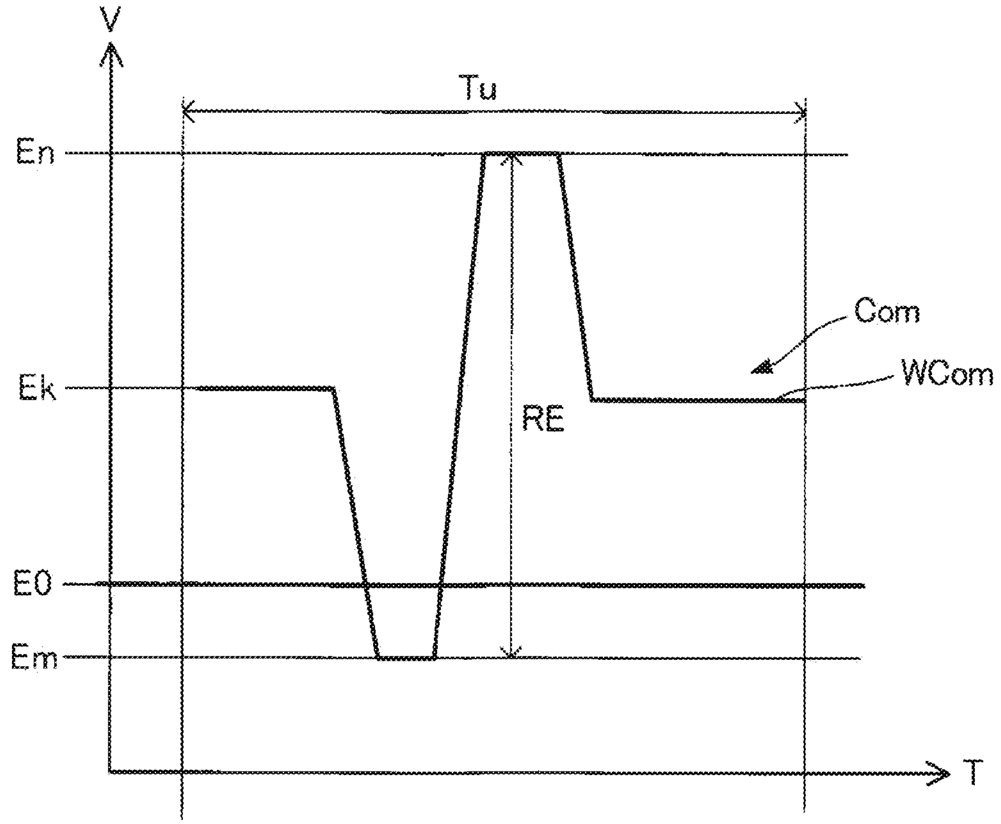
FIG. 5 is a view for describing a drive voltage and a reference voltage.

FIG. 5 is a view for describing the drive voltage Com and the reference voltage E0. In FIG. 5, the horizontal axis represents time, and the vertical axis represents voltage [V].

The drive voltage Com changes over time. The drive voltage Com includes a drive waveform WCom. The drive waveform WCom is repeated in a unit period Tu. The drive waveform WCom includes an intermediate potential Ek, a maximum potential En, and a minimum potential Em. The maximum potential En is the maximum value of the drive voltage Com. The minimum potential Em is the minimum value of the drive voltage Com. The drive waveform WCom descends from the intermediate potential Ek to the minimum potential Em, maintains the minimum potential Em, then ascends from the minimum potential Em to the maximum potential En, maintains the maximum potential En, and then descends to the intermediate potential Ek. The drive waveform WCom illustrated in FIG. 5 is an example, and the drive voltage Com may have other waveforms.

The reference voltage E0 does not change over time and remains constant. In the illustrated example, the reference voltage E0 has a voltage value higher than the minimum potential Em of the drive voltage Com, but is not limited thereto.

As described above, the piezoelectric body 443 is provided between the first electrode 441 and the second electrode 442. The piezoelectric body 443 is driven by a voltage difference between the reference voltage E0 applied to the first electrode 441 and the drive voltage Com applied to the second electrode 442. An applied voltage Ea, which is the difference between the reference voltage E0 and the drive voltage Com, is applied to the piezoelectric body 443.

Figure 6:
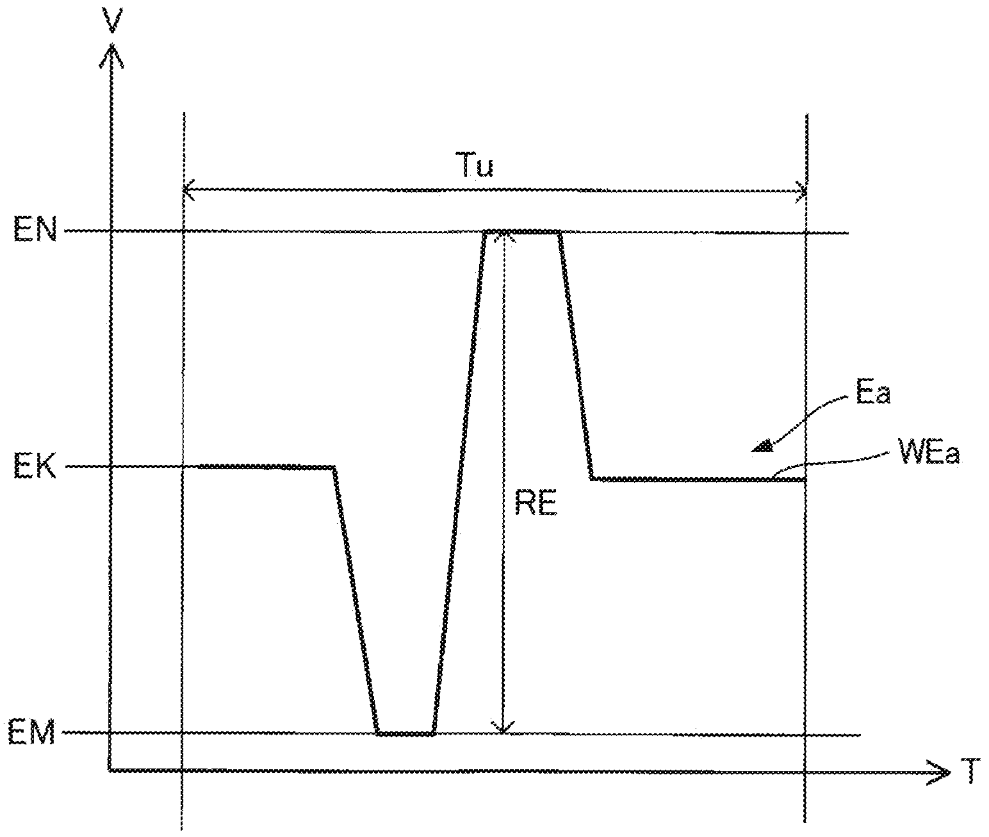
FIG. 6 illustrates an example of an applied voltage applied to a piezoelectric body.

FIG. 6 illustrates an example of the applied voltage Ea actually applied to the piezoelectric body 443 when the drive voltage Com and the reference voltage E0 illustrated in FIG. 5 are applied to the first electrode 441 and the second electrode 442, respectively. That is, the applied voltage Ea illustrated in FIG. 6 is obtained by subtracting the reference voltage E0 from the drive voltage Com illustrated in FIG. 5 at each time. In FIG. 6, the horizontal axis represents time, and the vertical axis represents voltage [V]. The applied voltage Ea includes a waveform WEa. The waveform WEa includes an intermediate potential EK, a maximum potential EN, and a minimum potential EM.

The maximum potential EN is a difference between the maximum potential En of the drive voltage Com and the reference voltage E0.

The minimum potential EM is a difference between the minimum potential Em of the drive voltage Com and the reference voltage E0. The waveform WEa illustrated in FIG. 6 is an example, and changes depending on the drive voltage Com and the reference voltage E0.

For example, it is assumed that the reference voltage E0 is 6 V, the minimum potential Em of the drive voltage Com is 2.5 V, and the maximum potential En of the drive voltage Com is 27.5 V in FIG. 5. In this case, the minimum potential EM of the applied voltage Ea illustrated in FIG. 6 is −3.5 V, and the maximum potential EN is 21.5 V. Further, when the drive voltage Com in FIG. 5 has a potential difference of 25 V, that is, when a voltage range RE of the drive voltage Com is 25 V, a voltage range RE of the applied voltage Ea is 25 V. Since the reference voltage E0 is constant, the voltage range RE of the applied voltage Ea and the voltage range RE of the drive voltage Com are equal to each other. The following description is mainly based on the assumption that the drive voltage Com is a positive voltage.

When the minimum potential Em of the drive voltage Com is lower than the reference voltage E0 as illustrated in FIG. 5, the minimum potential EM of the applied voltage Ea has a negative value. When the reference voltage E0 is 0, that is, when no voltage is applied to the second electrode 442, the minimum potential EM of the applied voltage Ea is equal to the minimum potential Em of the drive voltage Com. In addition, when the minimum potential Em of the drive voltage Com is also 0, the minimum potential EM of the applied voltage Ea also becomes 0.

Figure 7:
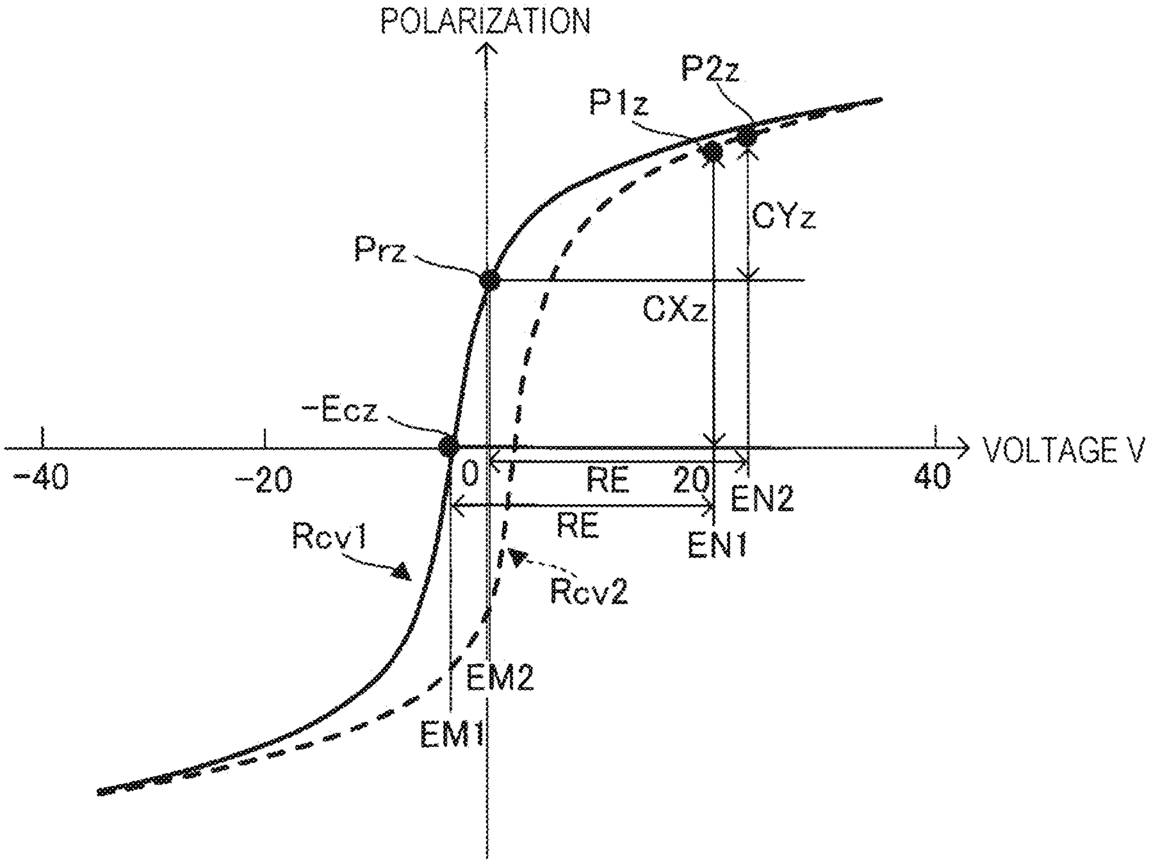
FIG. 7 illustrates an example of a hysteresis curve showing a relationship between a voltage and a polarization of a piezoelectric body included in a piezoelectric element of a comparative example.

1-5. Electrical Characteristics of Piezoelectric Body 443z of Comparative Example FIG. 7 illustrates an example of a hysteresis curve showing a relationship between a voltage and a polarization of a piezoelectric body 443*z* included in a piezoelectric element 44*z* of a comparative example. In FIG. 7, the horizontal axis represents voltage [V], and the vertical axis represents polarization [$\mu C/cm^2$].

As illustrated in FIG. 7, the hysteresis curve of the piezoelectric body 443*z* includes a positive remanent polarization Prz and a negative coercive electric field −Ecz. The remanent polarization Prz is a polarization at 0 V. The coercive electric field −Ecz is the magnitude of an electric field at which the polarization is 0 $\mu C/cm^2$.

Figure 11:
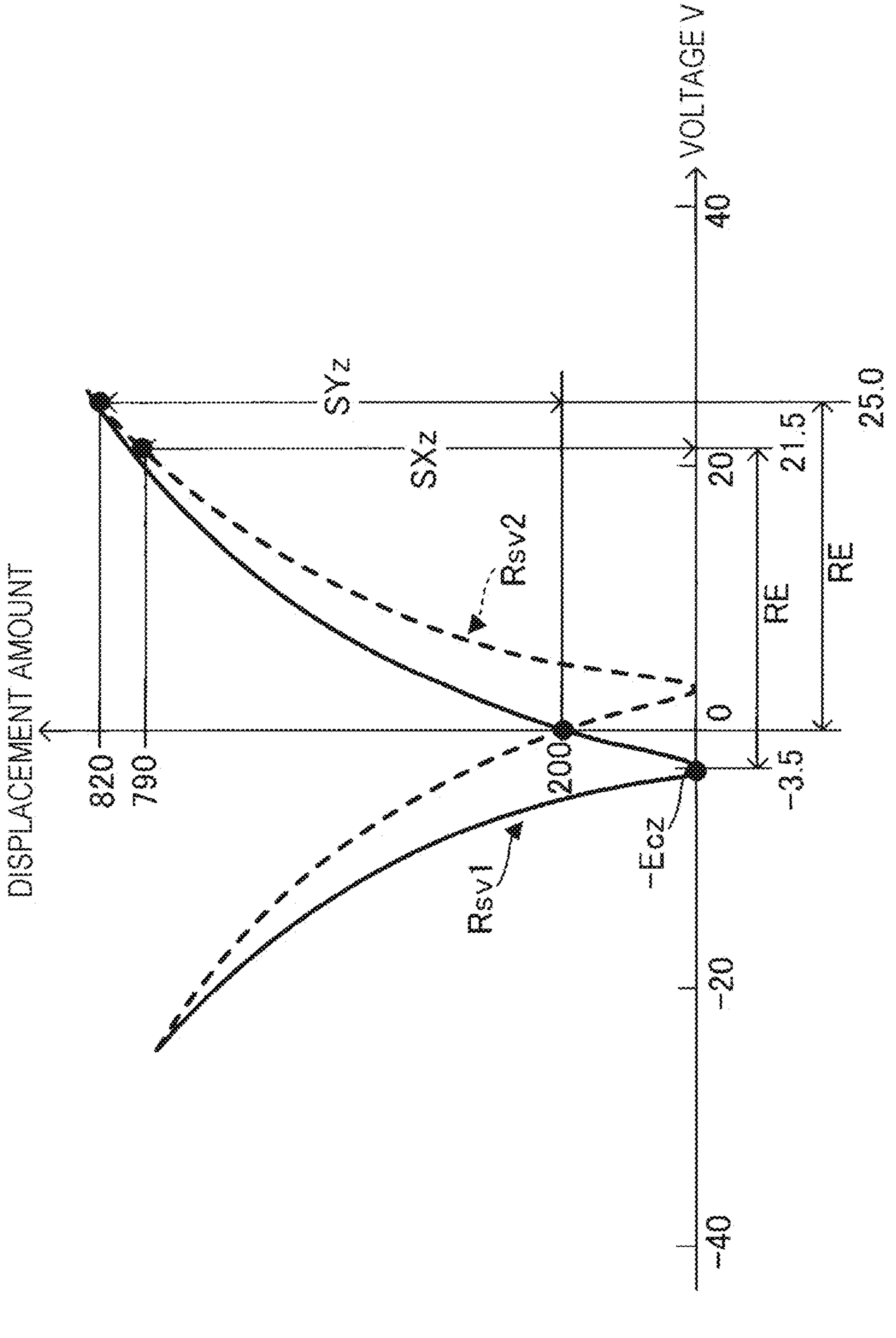
FIG. 11 illustrates a butterfly curve for the piezoelectric body of the comparative example.

FIG. 11 illustrates a butterfly curve showing a relationship between the voltage of the piezoelectric body 443*z* and a displacement amount of the diaphragm 36 (a distortion amount of the piezoelectric body) of the comparative example. In FIG. 11, the horizontal axis represents voltage [V], and the vertical axis represents the displacement amount [nm] of the diaphragm 36. The displacement amount of the diaphragm 36 indicates the amount of displacement from a position closest to a Z1 side (an opposite side to the pressure chamber C) toward a Z2 side (a pressure chamber C side), that is, a relative position based on the position closest to the Z1 side, the displacement amount of the diaphragm 36 being 0 at the position closest to the Z1 side.

Figure 9:
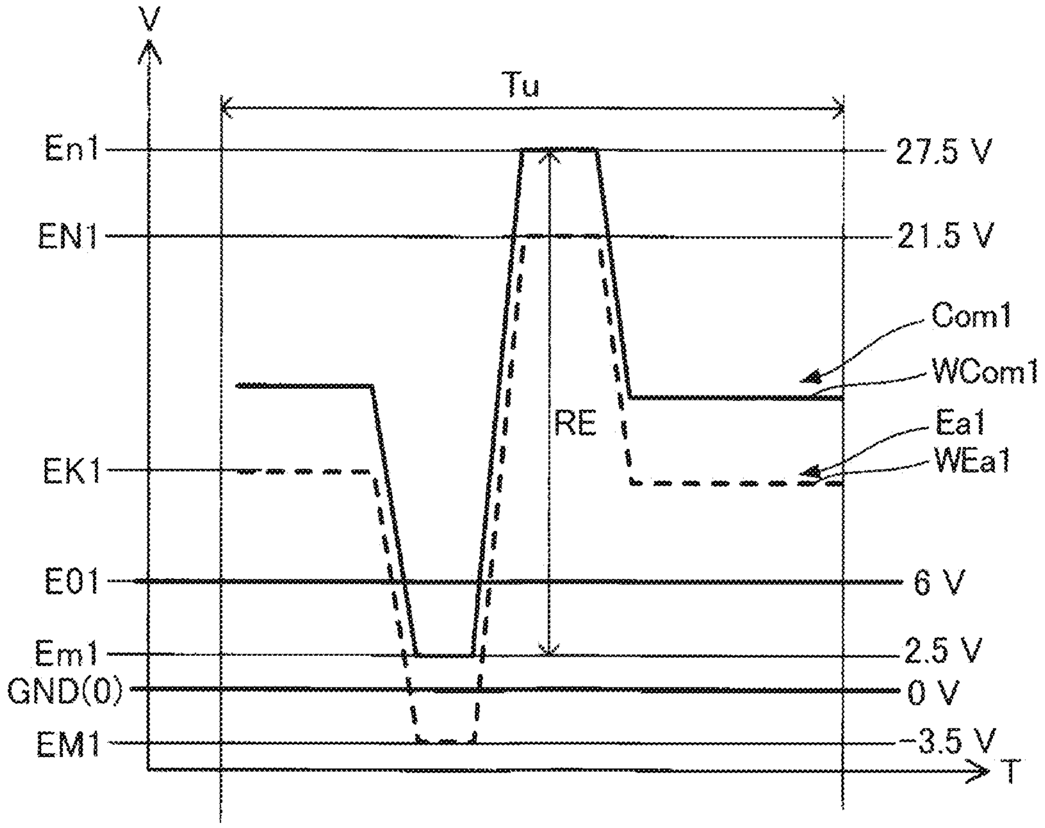
FIG. 9 is a view illustrating a first drive voltage and a first reference voltage.

First, it is assumed that, for the piezoelectric body 443*z* of the comparative example, a first drive voltage Com1 and a first reference voltage E01 are applied to the first electrode 441 and the second electrode 442. Here, the first reference voltage E01 is 6 V (E01=6 V), a minimum potential Em1 of the first drive voltage Com1 is 2.5 V (Em1=2.5 V), and a maximum potential En1 of the first drive voltage Com1 is 27.5 V (En1=27.5 V). The drive voltage Com1 and the first reference voltage E01 are illustrated in FIG. 9. In this case, a first applied voltage Ea1 applied to the piezoelectric body 443*z* has a minimum potential EM1 of −3.5 V and a maximum potential EN1 of 21.5 V (EN1=21.5 V), and has a voltage range RE of 25 V (RE=25 V). The minimum potential EM1 of −3.5 V (EM1=−3.5 V) corresponds to the coercive electric field −Ecz of the piezoelectric body 443*z*, and generally the drive voltage Com and reference voltage E0 having this relationship are used. This is because when the minimum potential EM1 reaches the coercive electric field −Ecz, the relative position of the diaphragm 36 is closest to the Z1 side as illustrated in FIG. 11, and a volume change of the pressure chamber C when the diaphragm 36 vibrates toward the Z2 side in subsequent driving becomes large, as a result of which ejection efficiency is high.

During a period in which the first applied voltage Ea1 changes from an intermediate potential EK1 to the minimum potential EM1 of −3.5 V (EM1=−3.5 V), the polarization changes toward a negative side to reach the coercive electric field −Ecz, that is, the polarization of 0, on a path Rcv1 of the hysteresis curve illustrated in FIG. 7. At this time, in the butterfly curve illustrated in FIG. 11, the displacement amount also changes toward the negative side (Z1 side) on a path Rsv1, and the displacement amount of the diaphragm 36 becomes closest to the negative side (the displacement amount is 0 nm) at the coercive electric field −Ecz (=−3.5) as described above.

Then, during a period in which the first applied voltage Ea1 changes from the minimum potential EM1 of −3.5 V (EM1=−3.5 V) to the maximum potential EN1 of 21.5 V (EN1=21.5 V), a shift from the path Rcv1 to a path Rcv2 is made, and the polarization also changes toward a positive side by the voltage range RE of 25 V (RE=25 V) in the hysteresis curve illustrated in FIG. 7. At this time, a shift from the path Rsv1 to a path Rsv2 is made also in the butterfly curve illustrated in FIG. 11, the displacement amount of the diaphragm 36 also changes to the positive side and becomes a displacement amount corresponding to the maximum potential EN1 of 21.5 V (EN1=21.5 V). The displacement amount of the diaphragm 36 at this time is 790 nm. During this period, the ink is ejected when the diaphragm 36 is displaced toward the Z2 side. In other words, a displacement amount difference SXz (=790 nm−0 nm=790 nm) from the minimum potential EM1 of −3.5 V (EM1=−3.5 V) to the maximum potential EN1 of 21.5 V (EN1=21.5 V) corresponds to an ejection characteristic in this case. For ease of understanding, in terms of the ejection amount according to the volume change of the pressure chamber C due to the displacement of the diaphragm 36, the displacement amount of 790 nm, which is a relatively large displacement amount, results in a relatively large ejection amount.

As can be seen from FIG. 11, the displacement amount SXz has a relatively large value. Therefore, the ejection efficiency is high. However, since it is necessary to apply the first reference voltage E01 of 6 V (E01=6 V) to the first electrode 441, circuits and wiring are required, which may increase cost and size.

Figure 10:
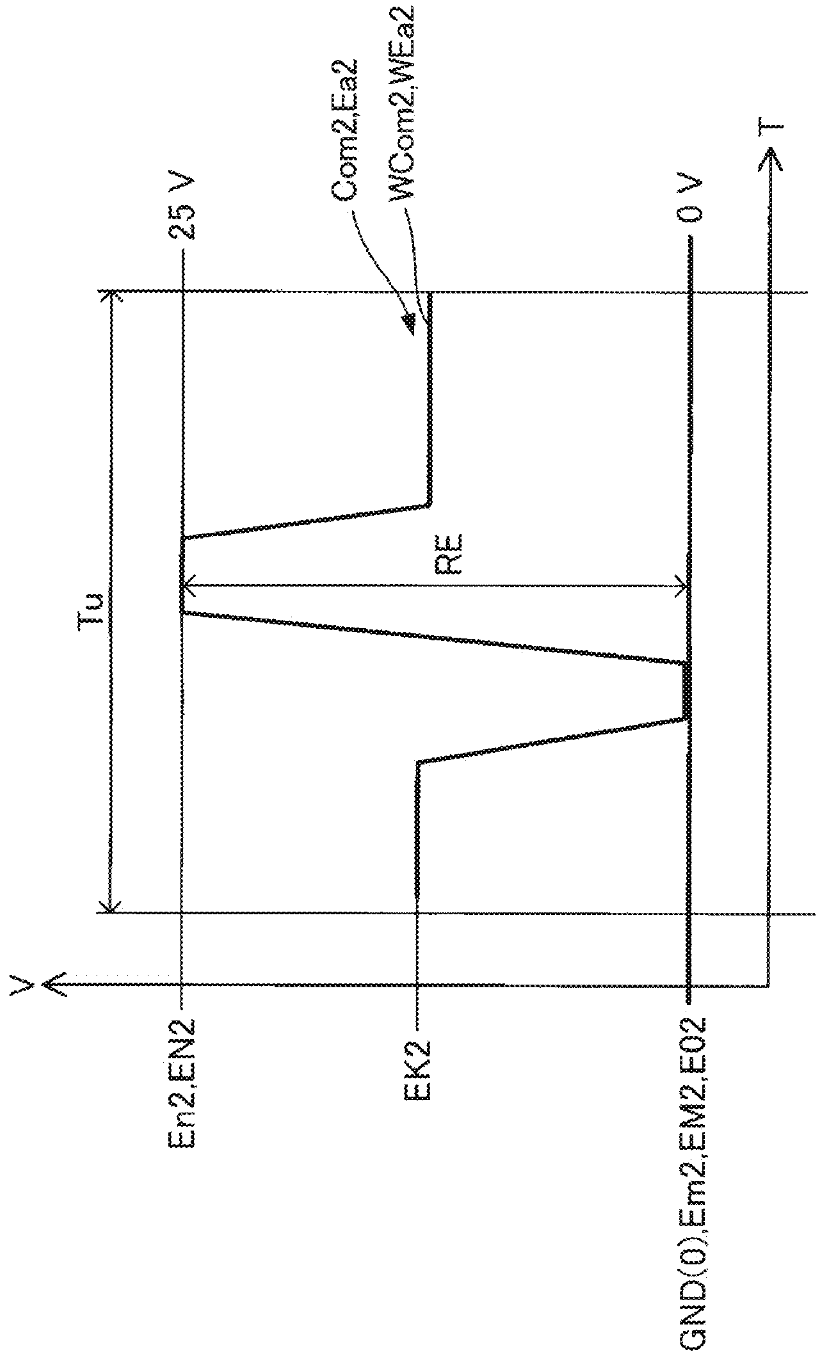
FIG. 10 is a view illustrating a second drive voltage and a second reference voltage.

Next, a case where a second reference voltage E02 is set to 0 V, that is, the second reference voltage E02 is set to a GND potential, is considered. At this time, a second drive voltage Com2 has a minimum potential Em2 of 0 V (Em2=0 V), and a maximum potential En2 of the second drive voltage Com2 is 25 V (En2=25 V). This drive voltage Com2 and the second reference voltage E02 are illustrated in FIG. 10. Since the second reference voltage E02 is 0 V (E02=0 V), a second applied voltage Ea2 applied to the piezoelectric body 443*z* also has a minimum potential EM2 of 0 V and a maximum potential EN2 of 25 V (EN2=25 V), and has a voltage range RE of 25 V (RE=25 V). The reason why the minimum potential Em2 of the second drive voltage Com2 is set to 0 V (Em2=0 V) is that, as described above, the closer the minimum potential EM2 is to the coercive electric field −Ecz, the higher the ejection efficiency is, and when the minimum potential EM2 has a negative value, the second drive voltage Com2 changes across positive and negative values, causing problems in an electric circuit. Although the second reference voltage E02 is set to 0 V (E02=0 V) as the optimum value that satisfies the above-described conditions, a phenomenon described below similarly occurs even when the second reference voltage E02 is around 0 V, for example, the second reference voltage E02 is 0.1 V.

During a period in which the second applied voltage Ea2 changes from an intermediate potential EK2 to the minimum potential EM2 of 0 V (EM2=0 V), the polarization changes toward the negative side to reach the second applied voltage Ea2 of 0 (Ea2=0), that is, the remanent polarization Prz, on the path Rcv1 of the hysteresis curve illustrated in FIG. 7. At this time, in the butterfly curve illustrated in FIG. 11, the displacement amount also changes toward the negative side (Z1 side) on the path Rsv1, and the displacement amount of the diaphragm 36 at the second applied voltage Ea2 of 0 (Ea2=0) does not change that far toward the negative side and becomes 200 nm.

Then, during a period in which the second applied voltage Ea2 changes from the minimum potential EM2 of 0 V (EM2=0 V) to the maximum potential EN2 of 25 V (EN2=25 V), a shift from the path Rcv1 to the path Rcv2 is made, and the polarization also changes toward the positive side by the voltage range RE of 25 V in the hysteresis curve illustrated in FIG. 7. At this time, the shift from the path Rsv1 to the path Rsv2 is made also in the butterfly curve illustrated in FIG. 11, the displacement amount of the diaphragm 36 also changes to the positive side and becomes 820 nm at the maximum potential EN2 of 25 V (EN2=25 V). Therefore, a displacement amount difference SYz (=820 nm−200 nm=620 nm) from the minimum potential EM2 of 0 V to the maximum potential EN2 of 25 V corresponds to an ejection characteristic in this case.

Here, in FIG. 11, the displacement amount difference SYz of 620 nm (SYz=620 nm) is considerably smaller than the displacement amount difference SXz of 790 nm, (SXz=790 nm) and a ratio SYz/SXz therebetween is only 78% (SYz/SXz=78%). This means that, although the voltage range RE in a case where the first reference voltage E01 is 6 V (E01=6 V), the minimum potential Em1 of the first drive voltage Com1 is 2.5 V (Em1=2.5 V), and the maximum potential En1 of the first drive voltage Com1 is 27.5 V (En1=27.5 V), and the voltage range RE in a case where the second reference voltage E02 is 0 V (E02=0 V), the minimum potential Em2 of the second drive voltage Com2 is 0 V (Em2=0 V), and the maximum potential En2 of the second drive voltage Com2 is 25 V (En2=25 V) are both 25 V, the ejection efficiency in the former case is much higher than that in the latter case. In other words, in a case of using the piezoelectric body 443*z* of the comparative example, sufficient ejection efficiency cannot be obtained when the second reference voltage E02 is 0 V (E02=0 V).

Figure 8:
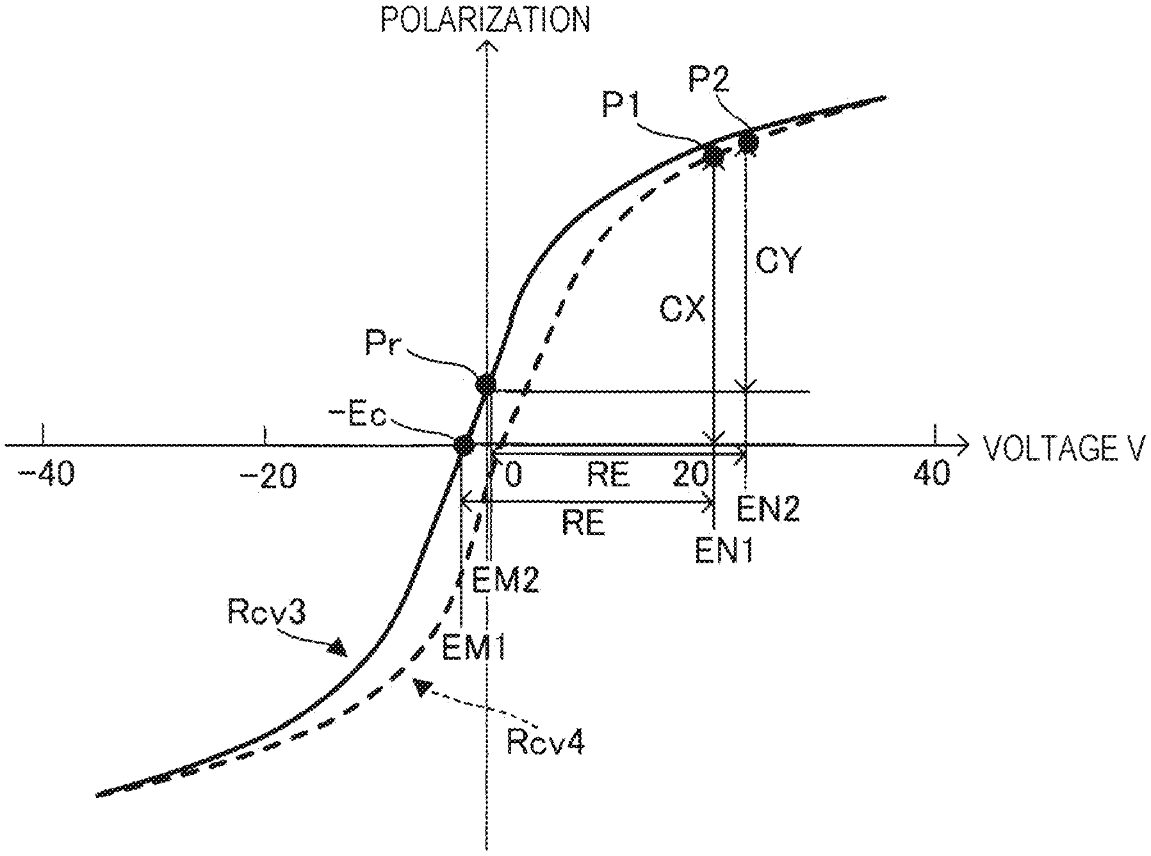
FIG. 8 illustrates an example of a hysteresis curve showing a relationship between a voltage and a polarization of the piezoelectric body included in a piezoelectric element of the first embodiment.

1-6. Electrical Characteristics of Piezoelectric Body 443 of First Embodiment FIG. 8 illustrates an example of a hysteresis curve showing a relationship between a voltage and a polarization of the piezoelectric body 443 included in the piezoelectric element 44 of the first embodiment. In FIG. 8, the horizontal axis represents voltage [V], and the vertical axis represents polarization [μC/cm$^2$].

As illustrated in FIG. 8, the hysteresis curve of the piezoelectric body 443 of the present embodiment includes a positive remanent polarization Pr and a negative coercive electric field −Ec. The remanent polarization Pr is a polarization at 0 V. The coercive electric field −Ec is the magnitude of an electric field at which the polarization is 0 μC/cm$^2$.

Figure 12:
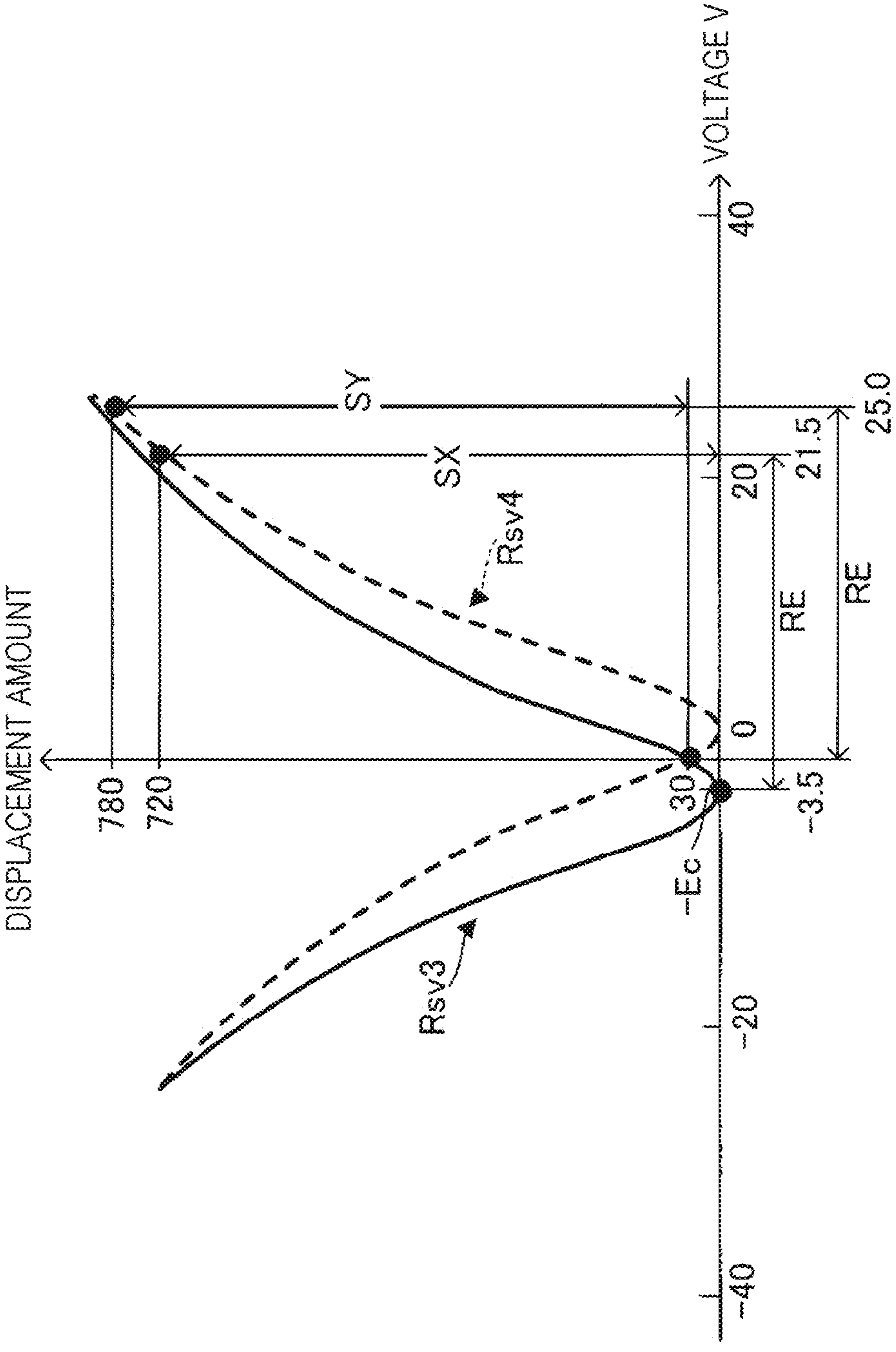
FIG. 12 illustrates a butterfly curve for the piezoelectric body of the first embodiment.

FIG. 12 illustrates a butterfly curve showing a relationship between the voltage of the piezoelectric body 443 and a displacement amount of the diaphragm 36 (a distortion amount of the piezoelectric body) of the first embodiment. In FIG. 12, the horizontal axis represents voltage [V], and the vertical axis represents the displacement amount [nm] of the diaphragm 36. The displacement amount of the diaphragm 36 indicates the amount of displacement from a position closest to the Z1 side (the opposite side to the pressure chamber C) toward the Z2 side (the pressure chamber C side), that is, a relative position based on the position closest to the Z1 side, the displacement amount of the diaphragm 36 being 0 at the position closest to the Z1 side.

First, similarly to the piezoelectric body 443*z* of the comparative example, it is assumed that, for the piezoelectric body 443 of the first embodiment, the first drive voltage Com1 (the minimum potential Em1=2.5 V and the maximum potential En1=27.5 V) and the first reference voltage E01 of 6 V (E01=6 V) illustrated in FIG. 9 described above are applied to the first electrode 441 and the second electrode 442.

During a period in which the first applied voltage Ea1 changes from the intermediate potential EK1 to the minimum potential EM1 of −3.5 V (EM1=−3.5 V), the polarization changes toward the negative side to reach the coercive electric field −Ec, that is, the polarization of 0, on a path Rcv3 of the hysteresis curve illustrated in FIG. 8. At this time, in the butterfly curve illustrated in FIG. 12, the displacement amount also changes toward the negative side (Z1 side) on a path Rsv3, and the displacement amount of the diaphragm 36 becomes closest to the negative side (the displacement amount is 0 nm) at the coercive electric field −Ec (=−3.5) as described above.

Then, during a period in which the first applied voltage Ea1 changes from the minimum potential EM1 of −3.5 V (EM1=−3.5 V) to the maximum potential EN1 of 21.5 V (EN1=21.5 V), a shift from the path Rcv3 to a path Rcv4 is made, and the polarization also changes toward the positive side by the voltage range RE of 25 V in the hysteresis curve illustrated in FIG. 8. At this time, a shift from the path Rsv3 to a path Rsv4 is made also in the butterfly curve illustrated in FIG. 12, the displacement amount of the diaphragm 36 also changes to the positive side and becomes a displacement amount corresponding to the maximum potential EN1 of 21.5 V (EN2=21.5 V). The displacement amount of the diaphragm 36 at this time is 720 nm. In other words, a displacement amount difference SX (=720 nm−0 nm=720 nm) from the minimum potential EM1 of −3.5 V (EM1=−3.5 V) to the maximum potential EN1 of 21.5 V (EN1=21.5 V) corresponds to an ejection characteristic in this case. In the following description, the displacement amount difference SX will also be referred to as a first displacement amount.

Next, similarly to the piezoelectric body 443*z* of the comparative example, it is assumed that, for the piezoelectric body 443 of the first embodiment, the second drive voltage Com2 (the minimum potential Em2=0 V and the maximum potential En2=25 V) and the second reference voltage E02 of 0 V (E02=0 V) illustrated in FIG. 10 described above are applied to the first electrode 441 and the second electrode 442.

During a period in which the second applied voltage Ea2 changes from the intermediate potential EK2 to the minimum potential EM2 of 0 V (EM2=0 V), the polarization changes toward the negative side to reach the second applied voltage Ea2 of 0 (Ea2=0), that is, the positive remanent polarization Pr, on the path Rcv3 of the hysteresis curve illustrated in FIG. 8. At this time, in the butterfly curve illustrated in FIG. 12, the displacement amount also changes to the negative side (the Z1 side) on the path Rsv3. At this time, unlike the piezoelectric body 443*z* of the comparative example, in a case of the piezoelectric body 443 of the first embodiment, the displacement amount of the diaphragm 36 at the second applied voltage Ea2 of 0 (Ea2=0) reaches a relatively negative side, and is 30 nm.

Then, during a period in which the second applied voltage Ea2 changes from the minimum potential EM2 of 0 V (EM2=0 V) to the maximum potential EN2 of 25 V (EN2=25 V), a shift from the path Rcv3 to the path Rcv4 is made, and the polarization also changes toward the positive side by the voltage range RE of 25 V (RE=25 V) in the hysteresis curve illustrated in FIG. 8. At this time, the shift from the path Rsv3 to the path Rsv4 is made also in the butterfly curve illustrated in FIG. 12, the displacement amount of the diaphragm 36 also changes to the positive side and becomes 780 nm at the maximum potential EN2 of 25 V (EN2=25 V). Therefore, a displacement amount difference SY (=780 nm−30 nm=750 nm) from the minimum potential EM2 of 0 V (EM2=0 V) to the maximum potential EN2 of 25 V (EN2=25 V) corresponds to an ejection characteristic in this case. In the following description, the displacement amount difference SY will also be referred to as a second displacement amount.

Here, in FIG. 12, the displacement amount difference SY of 750 nm (SY=750 nm) is substantially the same as the displacement amount difference SX of 720 nm, (SXz=720 nm) and a ratio SY/SX therebetween is 104% (SY/SX=104%). This means that the voltage range RE in a case where the first reference voltage E01 is 6 V (E01=6V), the minimum potential Em1 of the first drive voltage Com1 is 2.5 V (Em1=2.5 V), and the maximum potential En1 of the first drive voltage Com1 is 27.5 V (En1=27.5 V), and the voltage range RE in a case where the second reference voltage E02 is 0 V (E02=0V), the minimum potential Em2 of the second drive voltage Com2 is 0 V (Em2=0 V), and the maximum potential En2 of the second drive voltage Com2 is 25 V (En2=25 V) are both 25 V, and the ejection efficiencies in both cases are substantially the same as each other. In other words, in a case of using the piezoelectric body 443 of the first embodiment, the ejection efficiency does not change much even when the second reference voltage E02 is 0 V (E02=0 V).

1-7. Comparison Between Electrical Characteristics of Piezoelectric Body 443 and Piezoelectric Body 443*z*

Here, as can be seen by comparing FIG. 11 and FIG. 12, when the first drive voltage Com1 and the first reference voltage E01 illustrated in FIG. 9 are used, the displacement amount difference SX of 720 nm (SX=720 nm) of the piezoelectric body 443 in the first embodiment is slightly smaller than the displacement amount difference SXz of 790 nm (SXz=790 nm) of the piezoelectric body 443*z* in the comparative example. That is, when the first drive voltage Com1 and the first reference voltage E01 in FIG. 9 are used, the piezoelectric body 443 of the first embodiment has a slightly inferior ejection characteristic.

However, when the second drive voltage Com2 and the second reference voltage E02 illustrated in FIG. 10 are used, the displacement amount difference SY of 750 nm (SY=750 nm) of the piezoelectric body 443 in the first embodiment is considerably larger than the displacement amount difference SYz of 620 nm (SYz=620 nm) of the piezoelectric body 443*z* in the comparative example. That is, when the second drive voltage Com2 and the second reference voltage E02 in FIG. 10 are used, the piezoelectric body 443 of the first embodiment has a considerably better ejection characteristic.

Furthermore, in the piezoelectric body 443*z* of the comparative example, the displacement amount difference SYz of 620 nm (SYz=620 nm) when using the second drive voltage Com2 and the second reference voltage E02 as illustrated in FIG. 10 is considerably smaller than the displacement amount difference SXz of 790 nm (SXz=790 nm) when using the first drive voltage Com1 and the first reference voltage E01, and the ratio SYz/SXz is 78%. In other words, with the piezoelectric body 443*z* of the comparative example, the ejection efficiency is high when using the first drive voltage Com1 and the first reference voltage E01 illustrated in FIG. 9, and the ejection efficiency is not that high when using the second drive voltage Com2 and the second reference voltage E02 illustrated in FIG. 10.

On the other hand, in the piezoelectric body 443 of the first embodiment, the displacement amount difference SY of 750 nm (SY=750 nm) when using the second drive voltage Com2 and the second reference voltage E02 as illustrated in FIG. 10 is substantially the same as the displacement amount difference SX of 720 nm (SX=720 nm) when using the first drive voltage Com1 and the first reference voltage E01 illustrated in FIG. 9, and the ratio SY/SX is 104%. In other words, with the piezoelectric body 443 of the first embodiment, the ejection efficiency is high not only when using the first drive voltage Com1 and the first reference voltage E01 as illustrated in FIG. 9, but also when using the second drive voltage Com2 and the second reference voltage E02 as illustrated in FIG. 10.

As described above, with the piezoelectric body 443 of the present embodiment, a sufficient ejection characteristic can be obtained even when using the first drive voltage Com1 and the first reference voltage E01 as illustrated in FIG. 9. Further, even when the number of circuits or wirings is reduced by using the drive voltage Com2 and the second reference voltage E02 illustrated in FIG. 10 and not applying positive and negative voltages, a large difference in displacement amount of the piezoelectric body 443 is unlikely to occur, and a sufficient ejection characteristic can be obtained. This is because the piezoelectric body 443 is configured in such a way that a change in displacement amount of the diaphragm 36 from the coercive electric field −Ec of −3.5 (−Ec=−3.5) to 0 V, and a change in displacement amount of the diaphragm 36 from the coercive electric field −Ec+the voltage range RE to 0 V+the voltage range RE are set to have values as close to each other as possible.

Here, in the first embodiment, the second displacement amount SY is 104% of the first displacement amount SX. In order to obtain the sufficient ejection characteristic even when using the second drive voltage Com2 and the second reference voltage E02 as illustrated in FIG. 10, the second displacement amount SY needs to be larger than 90% of the first displacement amount SX. Furthermore, using the second drive voltage Com2 and second reference voltage E02 as illustrated in FIG. 10 has a greater effect of reducing the number of circuits or wirings than using the first drive voltage Com1 and first reference voltage E01 as illustrated in FIG. 9. Therefore, a better ejection characteristic may be obtained in the former case than in the latter case, that is, the second displacement amount SY may be as large as possible. Specifically, the second displacement amount SY may be larger than 95% of the first displacement amount SX. However, since the first drive voltage Com1 and the first reference voltage E01 may also be used as illustrated in FIG. 9, it is desirable to avoid a significant drop in ejection characteristic in this case, and from this perspective, the second displacement amount SY may be smaller than 110% of the first displacement amount SX.

Here, in the first embodiment, a difference (27.5 V−2.5 V=25 V) between the maximum potential En1 (27.5 V) and the minimum potential Em1 (2.5 V) of the first drive voltage Com1 is equal to a difference (25 V−0 V=25 V) between the maximum potential En2 (25 V) and the minimum potential Em2 (0 V) of the second drive voltage Com2. Further, a difference (2.5 V−6 V=−3.5 V) between the minimum potential Em1 (2.5 V) of the first drive voltage Com1 and the first reference voltage E01 (6 V) corresponds to the coercive electric field −Ec (−3.5 V) of the piezoelectric body 443. Further, a difference (0 V−0 V=0 V) between the minimum potential Em2 (0 V) of the second drive voltage Com2 and the second reference voltage E02 (0 V) is closer to 0 than a difference (2.5 V−6 V=−3.5 V) between the minimum potential Em1 (2.5 V) of the first drive voltage Com1 and the first reference voltage E01 (6 V).

1-8. Manufacturing Example of Piezoelectric Body 443

The piezoelectric body 443 of the present embodiment is formed, for example, as follows. For example, when the first electrode 441 contains iridium, iridium is not completely oxidized. By shortening an annealing time required for forming the first electrode 441 or by increasing a thickness of the first electrode 441, the degree of oxidation of iridium can be made insufficient. As a result, an amorphous state in which an interface between the piezoelectric body 443 and the first electrode 441 is not uniform is created. It is considered that a voltage at which polarization inversion occurs becomes more dispersed than in the past due to the non-uniform state of the interface. As a result, the piezoelectric body 443 of the embodiment having the hysteresis curve illustrated in FIG. 8 is obtained. It is considered that the piezoelectric body 443 of the present embodiment can be obtained even when the first electrode 441 is not an electrode made of iridium but an oxide electrode made of strontium ruthenate ($SrRuO_3$), lanthanum nickelate ($LaNiO_3$), or the like.

For example, when the piezoelectric body 443 is made of PZT, a ratio of zirconia (Zr) of PZT satisfies a relationship that $0.55<Zr/(Zr+Ti)$, thereby obtaining the piezoelectric body 443 of the present embodiment.

For example, when the piezoelectric body 443 is made of PZT as a main component, the piezoelectric body 443 includes an additive of Mg, Al, Fe, or Na, thereby obtaining the piezoelectric body 443 of the present embodiment. For example, in a case of B-site substitution, examples of the additive include Mg, Al, and Fe. In a case of A-site substitution, examples of the additive include Na. In a case of a hard material with a low valence number relative to a substitutional element, an increase in oxygen vacancies impedes or suppresses movement of domain walls. Therefore, it is considered that the piezoelectric body 443 of the present embodiment can be obtained.

It is sufficient if the piezoelectric body 443 of the present embodiment has the electrical characteristics as described above, and a manufacturing method thereof is not limited to this method.

2. Second Embodiment

A second embodiment will be described. The reference numerals used in the description of the first embodiment are used for the elements having the same actions or functions as those of the first embodiment in the embodiment exemplified below, and a detailed description of each element is appropriately omitted. In the second embodiment, a piezoelectric body 443 itself used is the same as that in the first embodiment. In the second embodiment, a second drive voltage Com2, a second reference voltage E02, and a second applied voltage Ea2 are different from those in the first embodiment.

Figure 13:
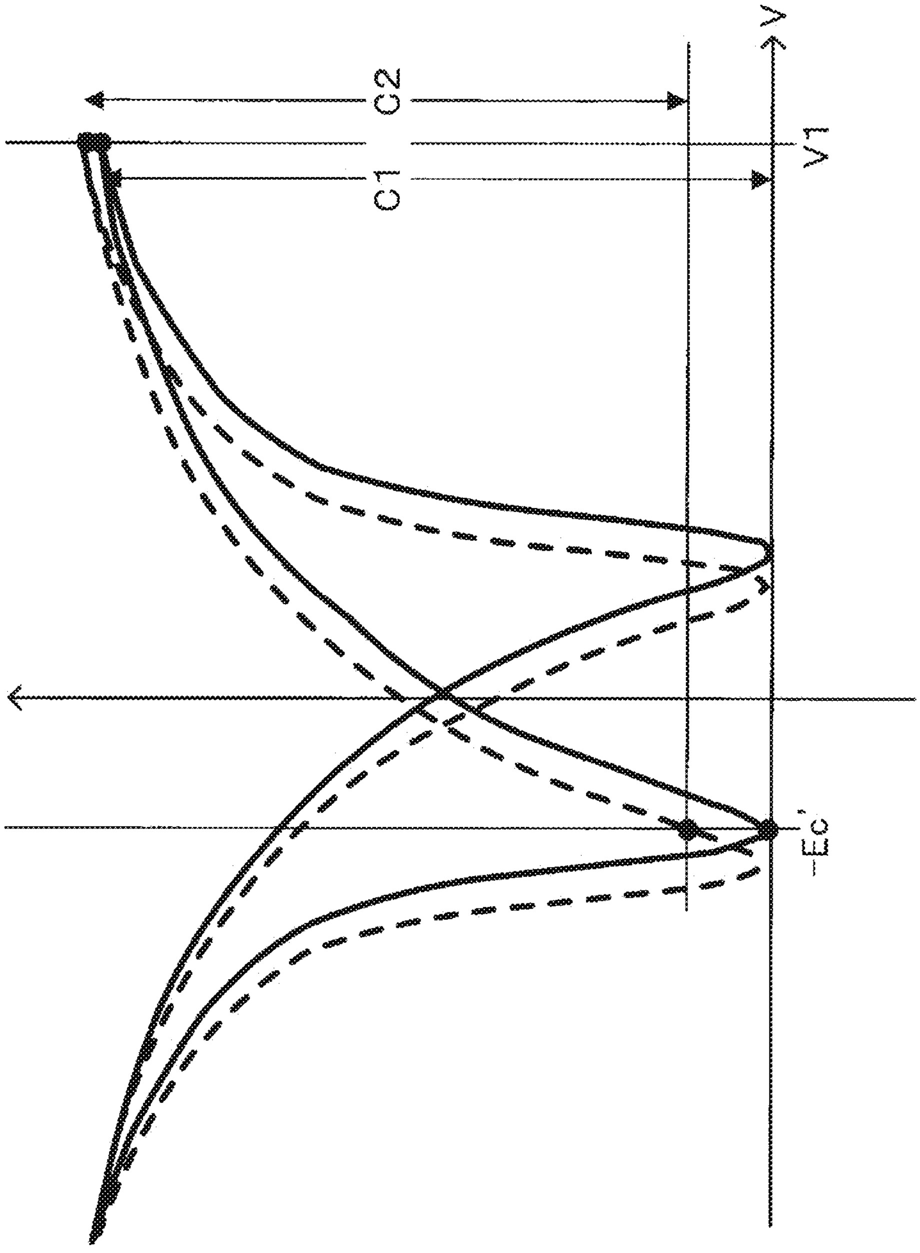
FIG. 13 illustrates an example of a butterfly curve for describing an imprint phenomenon.

When an applied voltage Ea is applied to the piezoelectric body for a long time, that is, when the number of ink ejection shots from a liquid ejecting head increases, an imprint phenomenon in which a hysteresis shape of the piezoelectric body is shifted occurs. FIG. 13 is a view for describing the imprint phenomenon, and is a view illustrating butterfly curves of the piezoelectric body before and after long-term voltage application. The solid line in FIG. 13 is the initial butterfly curve of the piezoelectric body before the applied voltage Ea is applied for a long time. The broken line in FIG. 13 is the butterfly curve of the piezoelectric body after the applied voltage Ea is applied for a long time. In FIG. 13, the horizontal axis represents voltage [V], and the vertical axis represents displacement amount.

Therefore, the butterfly curve of the piezoelectric body is also shifted. For example, there is a possibility that the butterfly curve indicated by the solid line in FIG. 13 is shifted to the butterfly curve indicated by the broken line in FIG. 13. As a result, a voltage response of the piezoelectric body in the vicinity of a coercive electric field −Ec' significantly changes with respect to a voltage response in a high voltage region.

Such an imprint phenomenon occurs when the applied voltage Ea is applied to the piezoelectric body for a long time, that is, when the number of shots increases. A shift amount increases as the number of shots increases. The imprint phenomenon occurs in both the piezoelectric body 443 of the first embodiment and the piezoelectric body 443*z* of the comparative example. In actual implementation, it is known that a shift to the negative side is made by about 1.5 V after 50 billion shots from an initial state of the piezoelectric body. As a result, when the imprint phenomenon occurs, a difference occurs in displacement amount. For example, a displacement amount C1 illustrated in FIG. 13 is obtained when the applied voltage Ea from the coercive electric field −Ec' to a voltage V1 is used in the initial state of the piezoelectric body. However, after the imprint phenomenon occurs and the butterfly curve is shifted to the broken line illustrated in FIG. 13, a displacement amount C2 illustrated in FIG. 13 is obtained when the applied voltage Ea from the coercive electric field −Ec' to the voltage V1 is used. As can be seen from FIG. 13, the displacement amount C2 is smaller than the displacement amount C1.

When it is assumed that a voltage obtained by shifting the applied voltage Ea by a voltage shift due to the imprint phenomenon is applied, the displacement amount C2 can be estimated from the butterfly curve in the initial state. In a case where a shift to the negative side is made by 1.5 V as described above, the displacement amount C2 can be obtained when a voltage obtained by shifting the applied voltage Ea to the positive side by 1.5 V, that is, a voltage from the coercive electric field −Ec'+1.5 V to the voltage V1+1.5 V, is used.

Figure 14:
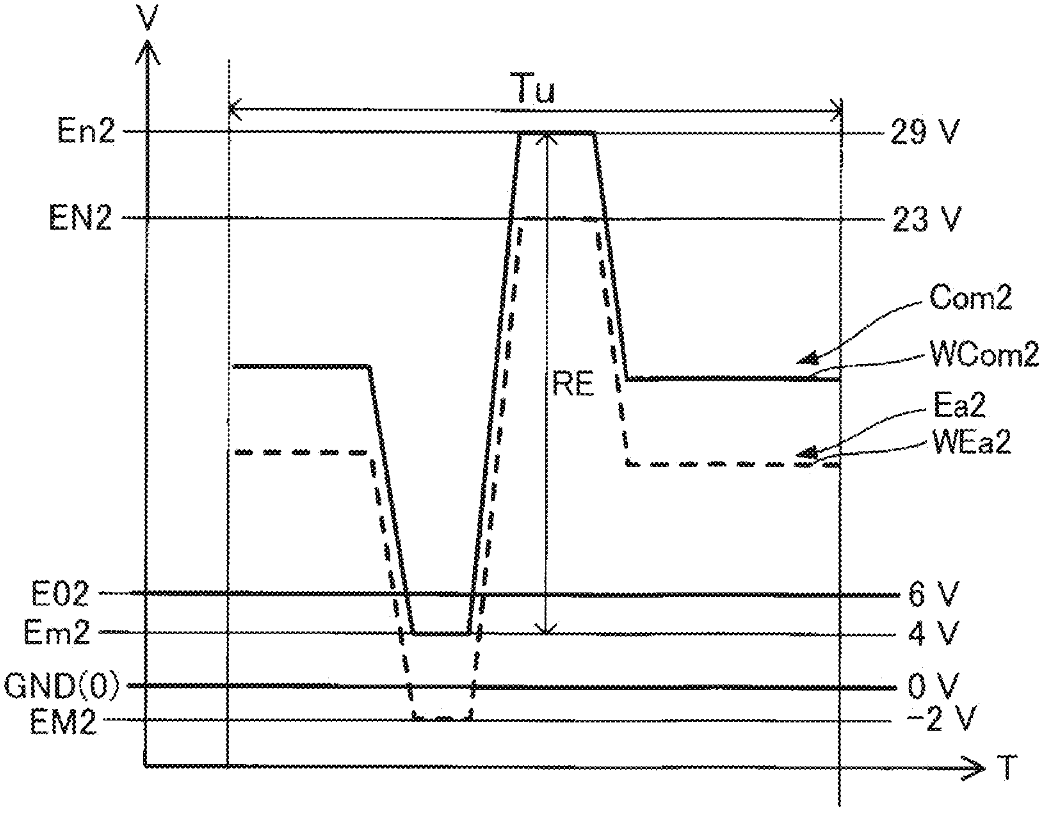
FIG. 14 is a view illustrating a second drive voltage and a second reference voltage in a second embodiment.

The second embodiment will be described with a case where the second drive voltage Com2 and the second reference voltage E02 illustrated in FIG. 14 are used in addition to a first drive voltage Com1 and a first reference voltage E01 illustrated in FIG. 9. Difference of the second drive voltage Com2 and second reference voltage E02 from those of the first embodiment will be mainly described. In the example of FIG. 14, the second drive voltage Com2 is set in consideration of the amount of a voltage shift due to the imprint phenomenon.

As described above, with the first drive voltage Com1 and the first reference voltage E01 in FIG. 9, a first applied voltage Ea1 has a minimum potential EM1 of −3.5 V, a maximum potential EN1 of 21.5 V (EN1=21.5 V), and a voltage range RE of 25 V (RE=25 V). The minimum potential EM1 of −3.5 V (EM1=−3.5 V) is set to correspond to a coercive electric field −Ec of the piezoelectric body 443. A minimum potential EM of the applied voltage Ea is −3.5 V, and a maximum potential EN is 21.5 V.

Next, the second drive voltage Com2 and the second reference voltage E02 of the second embodiment will be described using FIG. 14. A minimum potential Em2 of the second drive voltage Com2 is 4 V, and a maximum potential En2 of the second drive voltage Com2 is 29 V. This is because the second drive voltage Com2 is set to a value that is 1.5 V different from the first drive voltage Com1 to the positive side, taking into account an influence of the imprint phenomenon of 1.5 V to the negative side. Specifically, the minimum potential Em2 (4 V)=the minimum potential Em1 (2.5 V)+1.5 V, and the maximum potential En2 (29 V)=the maximum potential En1 (27.5 V)+1.5 V. A voltage range RE, which is a difference between the minimum potential Em2 and the maximum potential En2, is 25 V, and is equal to the voltage range RE of the first drive voltage Com1 illustrated in FIG. 9.

The second reference voltage E02 indicated by the solid line in FIG. 14 is equal to the first reference voltage E01 illustrated in FIG. 9. In the example of FIG. 14, the second reference voltage E02 is 6 V.

Therefore, the second applied voltage Ea2 applied to the piezoelectric body 443 when the second drive voltage Com2 and the second reference voltage E02 are applied is as indicated by the broken line in FIG. 14. That is, in a case of the second applied voltage Ea2, a minimum potential EM2=Em2−E02=4 V−6 V=−2 V, and a maximum potential EN2=En2−E02=29 V−6 V=23 V. A voltage range RE, which is a difference between the minimum potential EM2 and the maximum potential EN2, is 25 V, and is equal to the voltage range RE of the first applied voltage Ea1 illustrated in FIG. 9 described above. The second applied voltage Ea2 is obtained by shifting the first applied voltage Ea1 to the positive side by 1.5 V, which is the amount of change due to the imprint phenomenon. As a result, it is possible to evaluate the displacement amount of the piezoelectric body after the imprint phenomenon by using the second applied voltage Ea2.

Here, in the second embodiment, a difference (27.5 V−2.5 V=25 V) between the maximum potential En1 (27.5 V) and the minimum potential Em1 (2.5 V) of the first drive voltage Com1 is equal to a difference (29 V−4 V=25 V) between the maximum potential En2 (29 V) and the minimum potential Em2 (4 V) of the second drive voltage Com2. Further, a difference (2.5 V−6 V=−3.5 V) between the minimum potential Em1 (2.5 V) of the first drive voltage Com1 and the first reference voltage E01 (6 V) corresponds to the coercive electric field −Ec (−3.5 V) of the piezoelectric body 443. Further, a difference (4 V−6 V=−2 V) between the minimum potential Em2 (4 V) of the second drive voltage Com2 and the second reference voltage E02 (6 V) is closer to 0 than a difference (2.5 V−6 V=−3.5 V) between the minimum potential Em1 (2.5 V) of the first drive voltage Com1 and the first reference voltage E01 (6 V).

Figure 15:
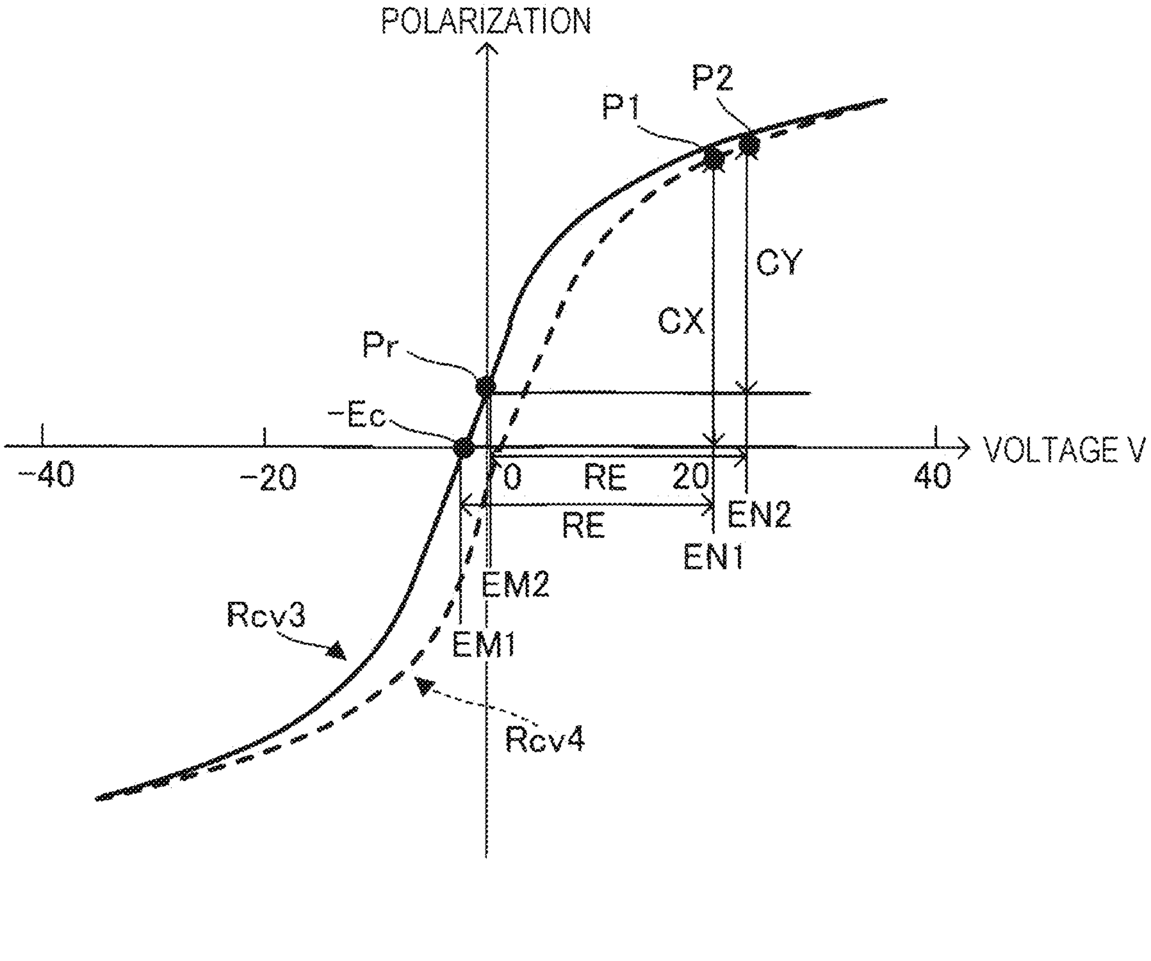
FIG. 15 illustrates an example of a hysteresis curve showing a relationship between a voltage and a polarization of a piezoelectric body of the second embodiment.

FIG. 15 illustrates an example of a hysteresis curve showing a relationship between a voltage and a polarization of the piezoelectric body 443 of the second embodiment. The hysteresis curve in FIG. 15 is the same as the hysteresis curve in FIG. 8.

Figure 16:
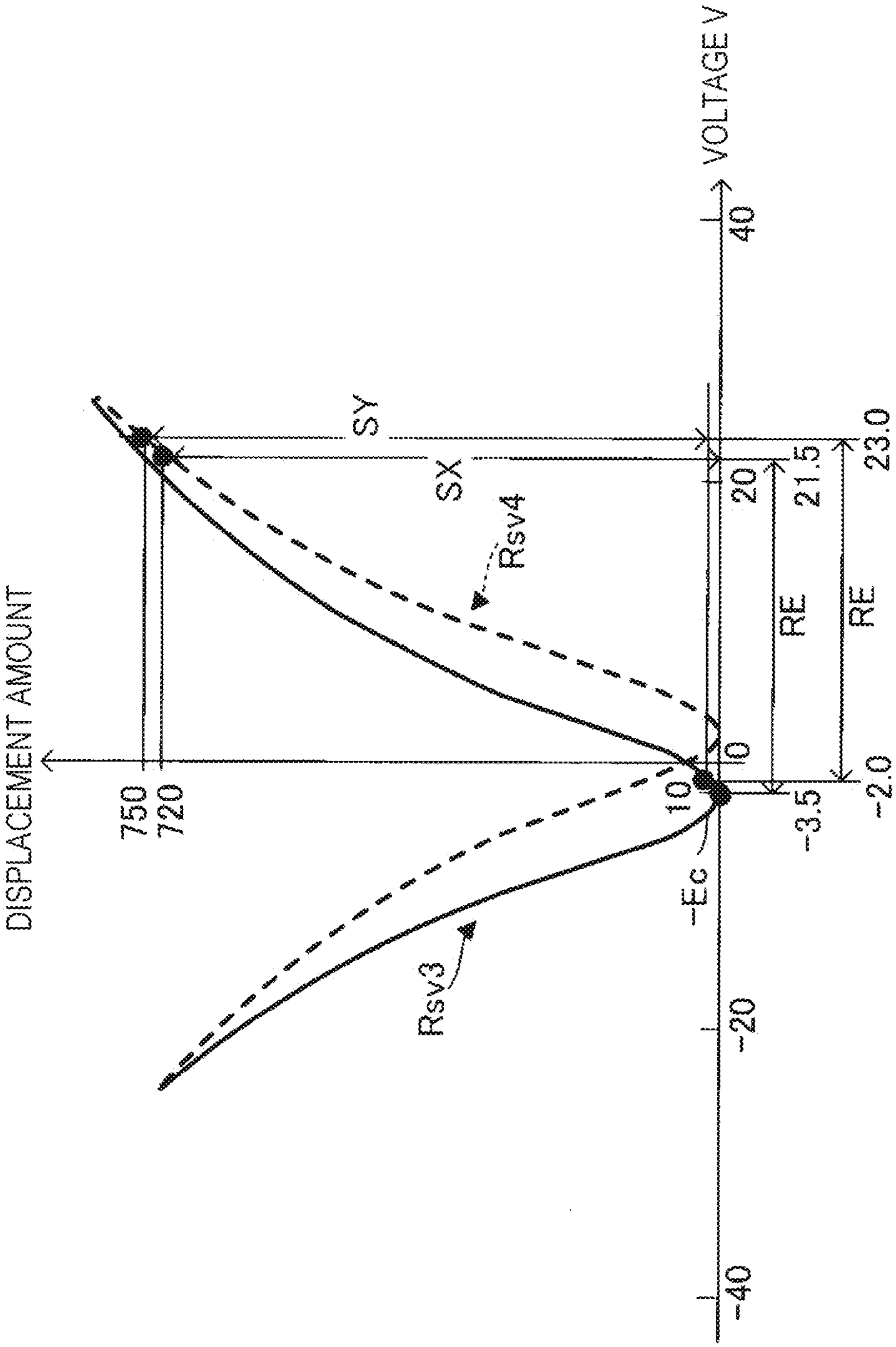
FIG. 16 illustrates a butterfly curve for the piezoelectric body of the second embodiment.

FIG. 16 illustrates a butterfly curve showing a relationship between the voltage of the piezoelectric body 443 and the displacement amount of a diaphragm 36 (a distortion amount of the piezoelectric body) of the second embodiment. The butterfly curve in FIG. 16 is the same as the butterfly curve in FIG. 12.

First, a displacement amount difference SX of the piezoelectric body 443 in the initial state is evaluated. When the first applied voltage Ea1 is applied to the piezoelectric body 443, the first applied voltage Ea1, the hysteresis curve in FIG. 15, and the butterfly curve in FIG. 16 are the same in the first embodiment and the second embodiment. Therefore, the results are also the same, and the displacement amount difference SX (first displacement amount) is also 720 nm.

Next, a displacement amount difference SY after the imprint phenomenon is evaluated. When the second applied voltage Ea2 is applied to the piezoelectric body 443 (initial state), the minimum potential EM2 is −2 V and the maximum potential EN2 is 23 V as described above. At the minimum potential EM2, the polarization is P3 and the displacement amount of the diaphragm 36 is 10 nm. Further, at the maximum potential EN2, the polarization is P4 and the displacement amount of the diaphragm 36 is 750 nm. Therefore, the displacement amount difference SY (second displacement amount) is 740 nm (750 nm−10 nm=740 nm).

As described above, in the second embodiment, the displacement amount difference SY of 740 nm (SY=740 nm) is substantially the same as the displacement amount difference SX of 720 nm (SX=720 nm), and a ratio SY/SX therebetween is 103% (SY/SX=103%). In other words, the displacement amount difference does not substantially change between the initial state and after the occurrence of the imprint phenomenon, that is, an ejection characteristic does not significantly deteriorate. In order to sufficiently suppress deterioration due to the imprint phenomenon, the second displacement amount SY needs to be larger than 90% of the first displacement amount SX. Further, after about 50 billion shots have been completed from the initial state, the imprint phenomenon does not occur much anymore. Therefore, during the life of the liquid ejecting head, a period of use after the imprint phenomenon of 1.5 V occurs tends to be longer than before. Therefore, it is better to place emphasis on the period after the imprint phenomenon occurs, that is, the second displacement amount SY may be as large as possible. Specifically, the second displacement amount SY may be larger than 95% of the first displacement amount SX. However, it is of course necessary to avoid deterioration of the ejection characteristic while the imprint phenomenon is occurring, and thus, it is better to secure the first displacement amount SX to a certain extent. Specifically, the second displacement amount SY may be smaller than 110% of the first displacement amount SX.

As described above, in this embodiment, the first reference voltage E01 is positive. The second reference voltage E02 is equal to the first reference voltage E01. Further, the minimum potential Em1, which is the minimum value of the first drive voltage Com1, is positive and lower than the first reference voltage E01. The minimum potential Em2, which is the minimum value of the second drive voltage Com2, is positive and higher than the minimum potential Em1 of the first drive voltage Com1. Therefore, in the present embodiment, the piezoelectric body can be evaluated in consideration of the amount of the voltage shift due to the imprint phenomenon.

In the second embodiment, when driving for actual liquid ejection, the first reference voltage E01 and the first drive voltage Com1 are basically used continuously from the initial state even after the imprint phenomenon occurs. That is, the second reference voltage E02 and the second drive voltage Com2 are used only for evaluating the piezoelectric body 443, and are not used for actual liquid ejection.

However, for example, the first reference voltage E01 and the first drive voltage Com1 may be used in the initial stage, and the second reference voltage E02 and the second drive voltage Com2 may be used after the number of drive shots exceeds a predetermined number. In this case, when the number of times a liquid ejecting head 26 is driven is a first number of times of driving, a voltage application unit 29 illustrated in FIG. 1 applies the first reference voltage E01 to a first electrode 441, and applies the first drive voltage Com1 to a second electrode 442 to cause nozzles N to eject a liquid. Further, when the number of times the liquid ejecting head 26 is driven is a second number of times of driving larger than the first number of times of driving, the voltage application unit 29 applies the second reference voltage E02 to the first electrode 441, and applies the second drive voltage Com2 to the second electrode 442 to cause the nozzles N to eject ink.

For example, the first number of times of driving is one or more and less than the second driving. The second number of times of driving is, for example, approximately hundreds of millions to several tens of billions. It is possible to reduce a rate of decrease in an ejection amount with the number of times of driving over a long time by changing a drive voltage Com according to the number of times of driving. The drive voltage Com may be changed not in two steps but in three or more steps.

Further, in the second embodiment, the second drive voltage Com2 is shifted in consideration of the imprint phenomenon. However, the second reference voltage E02 may be shifted without changing the second drive voltage Com2.

Figure 17:
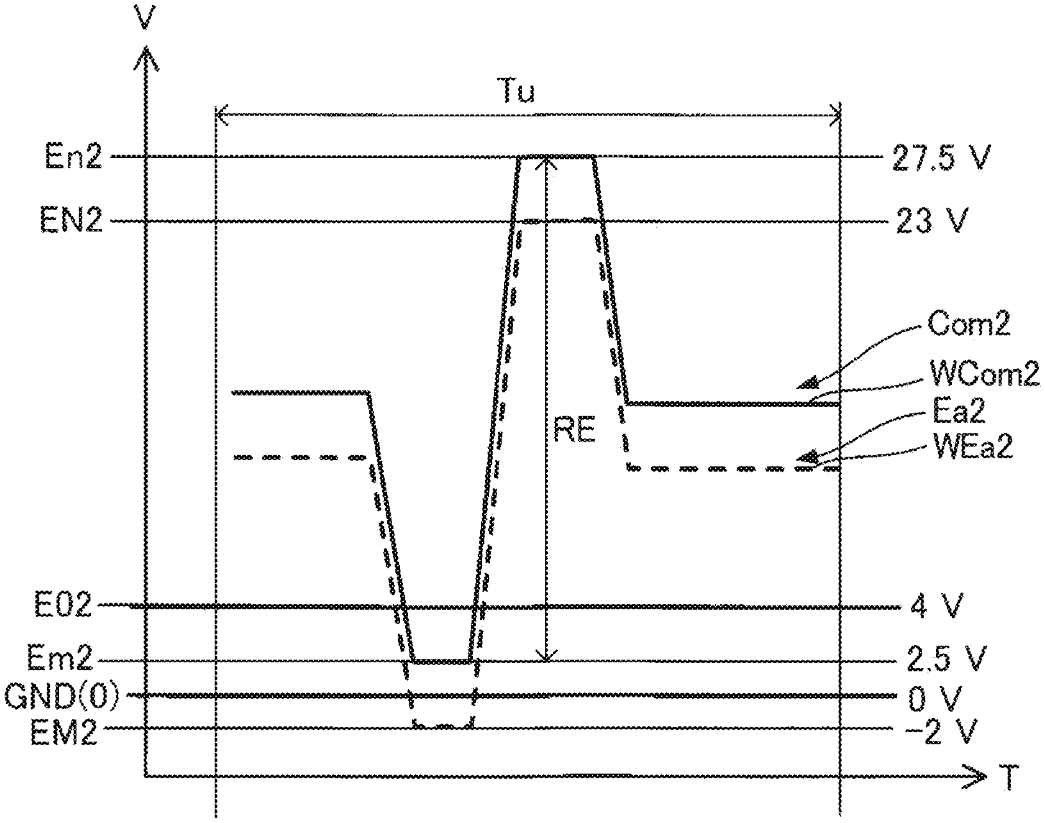
FIG. 17 is a view illustrating a second drive voltage and a second reference voltage of a modified example.

FIG. 17 is a view illustrating a second drive voltage Com2 and a second reference voltage E02 of a modified example. Differences of the second drive voltage Com2 and second reference voltage E02 in FIG. 17 from those of the example illustrated in FIG. 15 will be mainly described. In the example of FIG. 17, the second reference voltage E02 is set in consideration of the amount of a voltage shift due to the imprint phenomenon.

The second drive voltage Com2 in FIG. 17 is equal to the first drive voltage Com1 illustrated in FIG. 9. For example, a minimum potential Em2 is 2.5 V, and a maximum potential En2 is 27.5 V. A voltage range RE, which is a difference between the minimum potential Em2 and the maximum potential En2, is 25 V.

The second reference voltage E02 indicated by the solid line in FIG. 17 is equal to the first reference voltage E01 illustrated in FIG. 9. The second reference voltage E02 is set to a value that is 1.5 V different from the first reference voltage E01 to the negative side to cancel an influence of the imprint phenomenon of 1.5 V to the negative side. Specifically, the second reference voltage E02=(4.5 V)=the first reference voltage E01 (6 V)−1.5 V.

Therefore, in the modified example, a second applied voltage Ea2 applied to the piezoelectric body 443 when the second drive voltage Com2 and the second reference voltage E02 are applied is as indicated by the broken line in FIG. 17. That is, in a case of the second applied voltage Ea2, a minimum potential EM2=Em2−E02=2.5 V−4.5 V=−2 V, and a maximum potential EN2=En2−E02=27.5 V−4.5 V=23 V. A voltage range RE, which is a difference between the minimum potential EM2 and the maximum potential EN2, is 25 V, and is equal to the voltage range RE of the first applied voltage Ea1 illustrated in FIG. 9 described above. Each value of the applied voltage in the modified example is equal to the applied voltage in the second embodiment. Therefore, the obtained results are also the same.

Here, in the modified example, the difference (27.5 V−2.5 V=25 V) between the maximum potential En1 (27.5 V) and the minimum potential Em1 (2.5 V) of the first drive voltage Com1 is equal to a difference (27.5 V−2.5 V=25 V) between the maximum potential En2 (27.5 V) and the minimum potential Em2 (2.5 V) of the second drive voltage Com2. Further, the difference (2.5 V−6 V=−3.5 V) between the minimum potential Em1 (2.5 V) of the first drive voltage Com1 and the first reference voltage E01 (6 V) corresponds to the coercive electric field −Ec (−3.5 V) of the piezoelectric body 443. Further, a difference (2.5 V−4 V=−2 V) between the minimum potential Em2 (2.5 V) of the second drive voltage Com2 and the second reference voltage E02 (4.5 V) is closer to 0 than the difference (2.5 V−6 V=−3.5 V) between the minimum potential Em1 (2.5 V) of the first drive voltage Com1 and the first reference voltage E01 (6 V).

As described above, in the modified example, the first reference voltage E01 is positive. The second reference voltage E02 is positive and is lower than the first reference voltage E01. Further, the minimum potential Em1, which is the minimum value of the first drive voltage Com1, is positive and lower than the first reference voltage E01. The minimum potential Em2, which is the minimum value of the second drive voltage Com2, is equal to the minimum potential Em1 of the first drive voltage Com1. Therefore, in the present embodiment, the piezoelectric body can be evaluated in consideration of the amount of the voltage shift due to the imprint phenomenon.

Furthermore, it is presumed that the shift of the displacement amount of the piezoelectric body 443 described above is caused by the following factors. The first factor is considered to be a change in crystal structure of the piezoelectric body 443. For example, when the piezoelectric body 443 is a PZT thin film formed by a sol-gel method and the PZT thin film has a tetra composition of Zr/Ti=30/70, a morphotropic phase boundary (MPB) is shifted to a Ti side. Further, a crystal system of the PZT thin film formed by the sol-gel method is a monoclinic system, which is different from a crystal system of a bulk film formed by, for example, a sputtering method.

The PZT thin film formed by the sol-gel method is easily influenced by the second electrode 442 serving as a base. Therefore, it is considered that the MPB is shifted and the crystal system different from that of the bulk film appears. This is considered to be due to a difference in thermal expansion coefficient between the second electrode 442 and the piezoelectric body 443. In the initial state after the piezoelectric body 443 is formed, crystals of the piezoelectric body 443 are pulled in a direction parallel to an XY plane. However, when the piezoelectric element 44 is driven and the piezoelectric body 443 is released from a stress of the second electrode 442, the crystals attempt to be shifted to an original stable crystal structure.

The second factor is considered to be movement of charged particles. Electrons are trapped in oxygen vacancies, and a polarization axis as a fixed charge becomes fixed, resulting in a distortion that cannot respond to an electric field. The distorted crystal state tends to be stable. As a result, the optimum drive range changes due to a shift of the coercive electric field.

It is considered that such factors cause the imprint phenomenon in which the hysteresis shape of the piezoelectric body 443 is shifted. As described above, it is possible to reduce the rate of decrease in the ejection amount due to the shift caused by the imprint phenomenon by setting the minimum potential EM2 to a voltage in a range from the coercive electric field −Ec to the remanent polarization Pr.

3. Other Modified Examples

The embodiments exemplified above can be modified in various ways. Specific modified aspects that can be applied to the embodiments described above are described below by way of example. Two or more aspects arbitrarily selected from the following examples can be appropriately and compatibly combined.

Although the embodiments have been described assuming that the drive voltage Com is a positive voltage, the drive voltage Com may be a negative voltage. Even in this case, the applied voltage Ea is set based on the same technical idea as in the embodiments.

The "liquid ejecting head" may be a circulation type head having a so-called circulation flow path.

The "liquid ejecting apparatus" can be adopted in various devices such as a facsimile machine and a copy machine in addition to a device dedicated to printing. The use of the liquid ejecting apparatus is not limited to printing. For example, the liquid ejecting apparatus that ejects a solution of a coloring material is used as a producing apparatus that forms a color filter of a display device such as a liquid crystal display panel. Further, the liquid ejecting apparatus that ejects a solution of a conductive material is used as a producing apparatus that forms a wiring or electrode of a wiring substrate. Further, the liquid ejecting apparatus that ejects a solution of organic matter related to a living body is used as, for example, a producing apparatus that produces a biochip.

Although the present disclosure has been described above based on the exemplary embodiments, the present disclosure is not limited to the above-described embodiments. Further, a configuration of each portion according to the present disclosure can be substituted with an appropriate configuration that can implement the same functions as the above-described embodiments, and any appropriate configuration can also be added.

What is claimed is:

1. A liquid ejecting head comprising:
- a first electrode to which a reference voltage that does not change over time is applied;
- a second electrode to which a drive voltage that changes over time is applied;
- a piezoelectric body provided between the first electrode and the second electrode and driven by a voltage difference between the reference voltage and the drive voltage;
- a diaphragm that vibrates in response to the driving of the piezoelectric body; and a nozzle from which a liquid is ejected by the vibration of the diaphragm, wherein in a case where a displacement amount of the diaphragm when a first reference voltage is applied to the first electrode and a first drive voltage is applied to the second electrode is a first displacement amount, and a displacement amount of the diaphragm when a second reference voltage is applied to the first electrode and a second drive voltage is applied to the second electrode is a second displacement amount, a difference between a maximum value and a minimum value of the first drive voltage is equal to a difference between a maximum value and a minimum value of the second drive voltage, a difference between the minimum value of the first drive voltage and the first reference voltage corresponds to a coercive electric field of the piezoelectric body, a difference between the minimum value of the second drive voltage and the second reference voltage is closer to 0 than the difference between the minimum value of the first drive voltage and the first reference voltage, and the second displacement amount is larger than 90% of the first displacement amount.

2. The liquid ejecting head according to claim 1, wherein the second displacement amount is larger than 95% of the first displacement amount.

3. The liquid ejecting head according to claim 1, wherein the second displacement amount is smaller than 110% of the first displacement amount.

4. The liquid ejecting head according to claim 1, wherein a difference between the first reference voltage and the first drive voltage is a voltage at which the liquid is ejected from the nozzle when applied to the first electrode and the second electrode, and a difference between the second reference voltage and the second drive voltage is a voltage at which the liquid is ejected from the nozzle when applied to the first electrode and the second electrode.

5. The liquid ejecting head according to claim 1, wherein the first reference voltage is positive, the second reference voltage is equal to the first reference voltage, the minimum value of the first drive voltage is positive and lower than the first reference voltage, and the minimum value of the second drive voltage is positive and higher than the minimum value of the first drive voltage.

6. A liquid ejecting apparatus comprising:

the liquid ejecting head according to claim 5; and a voltage application unit that applies the first reference voltage to the first electrode and applies the first drive voltage to the second electrode to cause the nozzle to eject the liquid.

7. A liquid ejecting apparatus comprising:

the liquid ejecting head according to claim 5; and a voltage application unit that applies the first reference voltage to the first electrode and applies the first drive voltage to the second electrode when the number of times the liquid ejecting head is driven is a first number of times of driving to cause the nozzle to eject the liquid, and applies the second reference voltage to the first electrode and applies the second drive voltage to the second electrode when the number of times the liquid ejecting head is driven is a second number of times of driving larger than the first number of times of driving to cause the nozzle to eject the liquid.

8. The liquid ejecting head according to claim 1, wherein the first reference voltage is positive, the second reference voltage is positive and is lower than the first reference voltage, the minimum value of the first drive voltage is positive and lower than the first reference voltage, and the minimum value of the second drive voltage is equal to the minimum value of the first drive voltage.

9. The liquid ejecting head according to claim 1, wherein the first reference voltage is positive, the second reference voltage is 0, the minimum value of the first drive voltage is positive and lower than the first reference voltage, and the minimum value of the second drive voltage is 0.

10. A liquid ejecting apparatus comprising:

the liquid ejecting head according to claim 9; and a voltage application unit that applies the second reference voltage to the first electrode and applies the second drive voltage to the second electrode to cause the nozzle to eject the liquid.

* * * * *